US012218884B2

(12) United States Patent
Yang et al.

(10) Patent No.: US 12,218,884 B2
(45) Date of Patent: Feb. 4, 2025

(54) GLOBAL CYCLIC SHIFT DELAYS FOR DISTRIBUTED TRANSMISSIONS

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US); Qifan Chen, Newark, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 17/503,215

(22) Filed: Oct. 15, 2021

(65) Prior Publication Data

US 2023/0124579 A1    Apr. 20, 2023

(51) Int. Cl.
*H04L 5/00*    (2006.01)
*H04L 27/26*    (2006.01)

(52) U.S. Cl.
CPC ........ *H04L 5/0092* (2013.01); *H04L 27/2602* (2013.01); *H04L 27/2627* (2013.01)

(58) Field of Classification Search
None
See application file for complete search history.

(56) References Cited

U.S. PATENT DOCUMENTS

| | | | |
|---|---|---|---|
| 10,075,226 B2 | 9/2018 | Yang et al. | |
| 2016/0165482 A1* | 6/2016 | Yang ................. | H04L 27/26132 370/336 |
| 2021/0143955 A1 | 5/2021 | Yang et al. | |
| 2022/0369315 A1 | 11/2022 | Yang et al. | |

FOREIGN PATENT DOCUMENTS

| | | | | |
|---|---|---|---|---|
| WO | WO-2016054405 A1 * | 4/2016 | ........... | H04B 7/0452 |
| WO | WO-2021006494 A1 * | 1/2021 | ........... | H04L 1/0004 |

OTHER PUBLICATIONS

International Search Report and Written Opinion—PCT/US2022/041109—ISA/EPO—Dec. 8, 2022.

* cited by examiner

*Primary Examiner* — Yemane Mesfin
*Assistant Examiner* — Jeff Banthrongsack
(74) *Attorney, Agent, or Firm* — Holland & Hart LLP

(57) ABSTRACT

This disclosure provides methods, devices and systems for increasing the transmit power of wireless communication devices operating on power spectral density (PSD)-limited wireless channels. Some implementations more specifically relate to short training field (STF) designs and signaling that support distributed transmissions. A transmitting device that transmits data on a distributed resource unit (dRU) may transmit an STF sequence over a spreading bandwidth of the dRU according to an existing STF tone plan. Each STA allocated a dRU for transmission in a trigger-based (TB) physical layer convergence protocol (PLCP) protocol data unit (PPDU) maps its STF sequence to one or more spatial streams and may apply one or more global cyclic shift delays (CSDs) to the STF sequence mapped to the one or more spatial streams, respectively. As such, different global CSDs may be assigned to different STAs so that each STA transmits its STF sequence with different amounts of delay.

18 Claims, 21 Drawing Sheets

| Bit Position: | B0  B11 | B12  B19 | B20 | B21  B24 | B25 | B26  B31 | B32  B38 | B39 | |
|---|---|---|---|---|---|---|---|---|---|
| | AID12 | RU Allocation | UL FEC Coding Type | UL EHT-MCS | Reserved | SS Allocation/ RA-RU Information | UL Target Receive Power | PS160 | Trigger Dependent User Info |
| # Bits | 12 | 8 | 1 | 4 | 1 | 6 | 7 | 1 | variable |

| Bit Position: | B0 B3 | B4 B15 | B16 | B17 | B18 B19 | B20 B21 | B22 | B23 B25 |
|---|---|---|---|---|---|---|---|---|
| | Trigger Type | UL Length | More TF | CS Required | UL BW | GI And HE-LTF Type | MU-MIMO HE-LTF Mode | Number Of EHT-LTF Symbols And Midamble Periodicity |
| # Bits: | 4 | 12 | 1 | 1 | 2 | 2 | 1 | 3 |

| Bit Position: | B26 | B27 | B28 B33 | B34 B35 | B36 | B37 B52 | B53 | B54 |
|---|---|---|---|---|---|---|---|---|
| | UL STBC | LDPC Extra Symbol Segment | AP Tx Power | Pre-FEC Padding Factor | PE Disambiguity | UL Spatial Reuse | Doppler | HE/EHT P160 |
| # Bits: | 1 | 1 | 6 | 2 | 1 | 16 | 1 | 1 |

| Bit Position: | B55 | B56 B62 | B63 | |
|---|---|---|---|---|
| | Special User Info Field Present | Reserved | Reserved | Trigger Dependent Common Info |
| # Bits: | 1 | 7 | 1 | variable |

*Figure 15*

GLOBAL CYCLIC SHIFT DELAYS FOR DISTRIBUTED TRANSMISSIONS

TECHNICAL FIELD

This disclosure relates generally to wireless communication, and more specifically to global cyclic shift delays (CSDs) for distributed transmissions.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some instances, APs and STAs may be subject to power spectral density (PSD) limits. For example, some APs and STAs that operate in the 6 gigahertz (GHz) frequency band may be required to conform to a low power indoor (LPI) power class, which limits the transmit power of APs and STAs (in the 6 GHz band) to 5 decibel-milliwatts per megahertz (dBm/MHz) and −1 dBm/MHz, respectively. In other words, transmit power in the 6 GHz band is PSD-limited on a per-MHz basis. Such PSD limits can undesirably reduce the range of wireless communications and may reduce packet detection and channel estimation capabilities of APs and STAs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include obtaining data for transmission in a physical layer convergence protocol (PLCP) protocol data unit (PPDU); modulating the data on a number (M) of tones mapped to M noncontiguous subcarrier indices of a plurality of subcarrier indices spanning a wireless channel according to a distributed tone plan, where the M tones mapped to the M noncontiguous subcarrier indices represent a distributed resource unit (dRU) assigned to the wireless communication device; obtaining a sequence of first values representing a short training field (STF) of the PPDU based on a bandwidth associated with the wireless channel; mapping the data and the sequence of first values to one or more spatial streams; applying one or more first cyclic shift delays (CSDs) to the sequence of first values mapped to the one or more spatial streams, respectively, based on the dRU assignment; and transmitting the PPDU, including the sequence of first values mapped to the one or more spatial streams, over the wireless channel.

In some aspects, the method may further include obtaining a sequence of second values representing a long training field (LTF) of the PPDU; mapping the sequence of second values to the one or more spatial streams; and applying the one or more first CSDs to the data and the sequence of second values mapped to the one or more spatial streams, respectively. In some other aspects, the method may further include obtaining a sequence of second values representing an LTF of the PPDU; mapping the sequence of second values to the one or more spatial streams; and applying one or more second CSDs to the data and the sequence of second values mapped to the one or more spatial streams, respectively, where the one or more second CSDs are different than the one or more first CSDs.

In some aspects, the method may further include generating the one or more first CSDs as a function of an association identifier (AID) value assigned to the wireless communication device. In some other aspects, the method may further include obtaining the one or more first CSDs from a CSD table having a number (N) of entries each indicating a respective CSD associated with the distributed tone plan. In some implementations, N may be equal to 8 or 16. In some aspects, the obtaining of the one or more first CSDs may include calculating a start index associated with the one or more first CSDs based on information assigned to the wireless communication device, where the start index points to one of the N entries of the CSD table. In some implementations, the information assigned to the wireless communication device may include at least one of an AID value, a resource unit (RU) assignment index associated with the dRU, or a start tone offset associated with the dRU. In some implementations, the start index may be calculated as a modulo operation of the information assigned to the wireless communication device and N.

In some other aspects, the obtaining of the one or more first CSDs may include receiving a trigger frame soliciting the PPDU from the wireless communication device, where the trigger frame carries CSD information indicating a start index associated with the one or more first CSDs, where the start index points to one of the N entries of the CSD table. In some implementations, the CSD information may be carried in a user information field associated with the wireless communication device. In some aspects, the trigger frame may further carry distributed transmission information indicating that the data is to be transmitted according to the distributed tone plan and may carry dRU distribution bandwidth information indicating the bandwidth associated with the wireless channel. In some implementations, the distributed transmission information and the dRU distribution bandwidth information may be carried in a user information field associated with the wireless communication device. In some other implementations, the distributed transmission information may be carried in a common information field, or a special user information field immediately following the common information field, and the dRU distribution bandwidth information may be carried in a user information field associated with the wireless communication device.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including obtaining data for transmission in a PPDU; modulating the data on a number (M) of tones mapped to M noncontiguous subcarrier indices of a plurality of subcarrier indices spanning a wireless channel according to a distributed tone plan, where the M tones mapped to the M noncontiguous subcarrier indices represent a dRU assigned to the wireless communication device; obtaining a sequence of first values representing an STF of the PPDU based on a bandwidth associated with the wireless channel; mapping the data and the sequence of first values to one or more spatial streams; applying one or more first CSDs to the sequence of first values mapped to the one or more spatial streams, respectively, based on the dRU assignment; and transmitting the PPDU, including the sequence of first values mapped to the one or more spatial streams, over the wireless channel.

Another innovative aspect of the subject matter described in this disclosure can be implemented as a method of wireless communication. The method may be performed by a wireless communication device, and may include transmitting a trigger frame soliciting a trigger-based (TB) PPDU from one or more wireless stations (STAs), where the trigger frame carries first distributed transmission information indicating that a first data portion of the TB PPDU is to be transmitted according to a distributed tone plan and further carrying first dRU distribution bandwidth information indicating a bandwidth of a wireless channel allocated for the transmission of the first data portion; receiving the TB PPDU from the one or more STAs responsive to the trigger frame; and recovering the first data portion of the TB PPDU from a number (M) of tones mapped to M noncontiguous subcarrier indices of a plurality of subcarrier indices spanning the wireless channel according to the distributed tone plan.

In some implementations, the first distributed transmission information and the first dRU distribution bandwidth information may be carried in a user information field associated with a first STA of the one or more STAs. In some other implementations, the first distributed transmission information may be carried in a common information field, or a special user information field immediately following the common information field, and the first dRU distribution bandwidth information may be carried in a user information field associated with a first STA of the one or more STAs.

In some implementations, the trigger frame may further carry second distributed transmission information indicating that a second data portion of the TB PPDU is to be transmitted according to the distributed tone plan and may carry second dRU distribution bandwidth information indicating that the bandwidth of the wireless channel is allocated for the transmission of the second data portion. In some implementations, the first data portion may be received on one or more first spatial streams and the second data portion may be received on one or more second spatial streams, where the TB PPDU further includes an STF carrying a sequence of first values that is received on each of the one or more first spatial streams and on each of the one or more second spatial streams.

In some aspects, the sequence of first values received on the one or more first spatial streams may be delayed by one or more first CSDs, respectively, and the sequence of first values received on the one or more second spatial streams may be delayed by one or more second CSDs, respectively. In some implementations, the trigger frame may further carry first CSD information indicating a first start index associated with the one or more first CSDs and may carry second CSD information indicating a second start index associated with the one or more second CSDs, where the first start index points to a first entry of a CSD table having a number (N) of entries each indicating a respective CSD associated with the distributed tone plan and where the second start index points to a second entry of the CSD table that is different than the first entry. In some implementations, N may be equal to 8 or 16. In some implementations, the first CSD information may be carried in a user information field associated with a first STA of the one or more STAs and the second CSD information may be carried in a user information field associated with a second STA of the one or more STAs.

In some implementations, the TB PPDU may further include an LTF carrying a sequence of second values that is received on each of the one or more first spatial streams and a sequence of third values that is received on each of the one or more second spatial streams, where the first data portion and the sequence of second values received on the one or more first spatial streams are delayed by the one or more first CSDs, respectively, and where the second data portion and the sequence of third values received on the one or more second spatial streams are delayed by the one or more second CSDs, respectively.

In some other implementations, the TB PPDU may further include an LTF carrying a sequence of second values that is received on each of the one or more first spatial streams and a sequence of third values that is received on each of the one or more second spatial streams, where the first data portion and the sequence of second values received on the one or more first spatial streams are delayed by one or more third CSDs, respectively, that are different than the one or more first CSDs, and where the second data portion and the sequence of third values received on the one or more second spatial streams are delayed by one or more fourth CSDs, respectively, that are different than the one or more second CSDs.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including transmitting a trigger frame soliciting a TB PPDU from one or more STAs, where the trigger frame carries first distributed transmission information indicating that a first data portion of the TB PPDU is to be transmitted according to a distributed tone plan and further carrying first dRU distribution bandwidth information indicating a bandwidth of a wireless channel allocated for the transmission of the first data portion; receiving the TB PPDU from the one or more STAs responsive to the trigger frame; and recovering the first data portion of the TB PPDU from a number (M) of tones mapped to M noncontiguous subcarrier indices of a plurality of subcarrier indices spanning the wireless channel according to the distributed tone plan.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 13 shows a user information field for a trigger frame formatted in accordance with an existing trigger frame format.

FIG. 15 shows a common information field for a trigger frame formatted in accordance with an existing trigger frame format.

Like reference numbers and designations in the various drawings indicate like elements.

DETAILED DESCRIPTION

Figure 1:
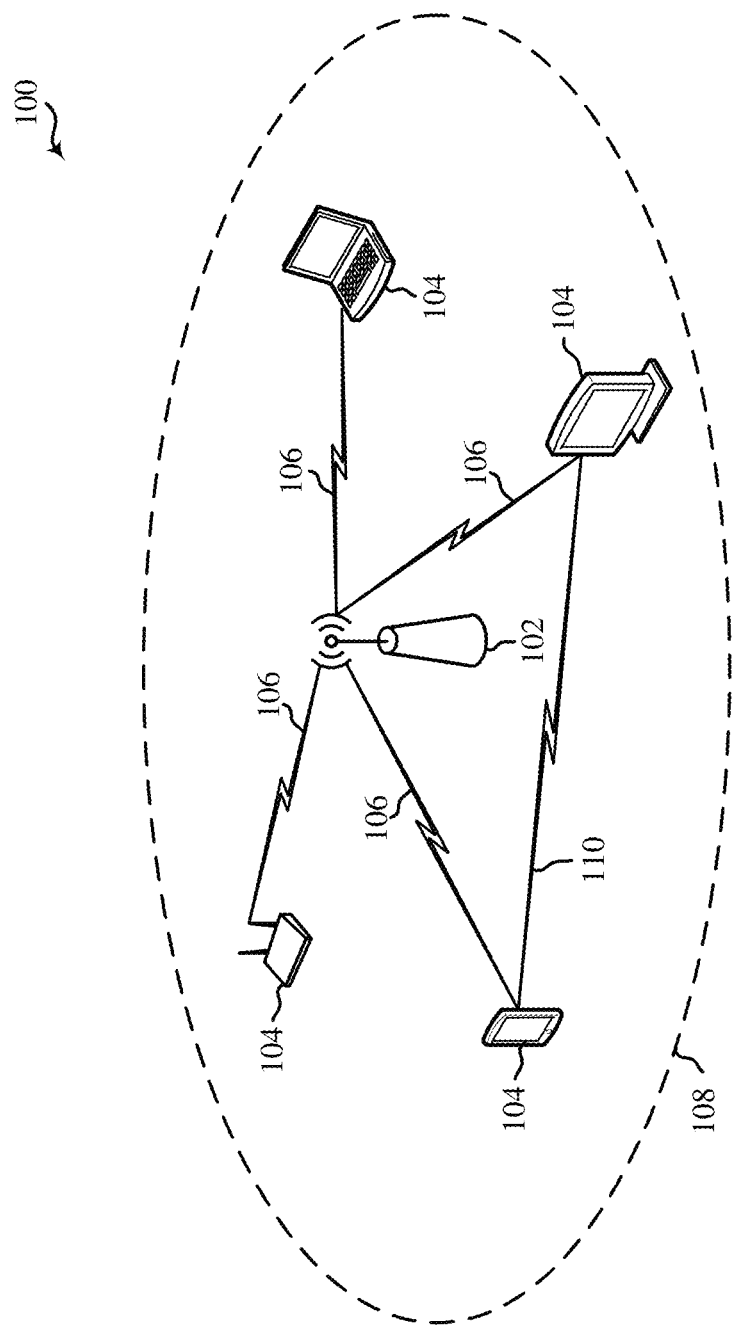
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

As used herein, the term "distributed transmission" refers to the transmission of a physical layer convergence protocol (PLCP) protocol data unit (PPDU) on noncontiguous tones (or subcarriers) of a wireless channel (such as in accordance with a "distributed tone plan"). Such noncontiguous tones represent a "distributed" resource unit (dRU). In contrast, a "regular" resource unit (rRU) is any set of contiguous tones defined by existing versions of the IEEE 802.11 standard (also referred to as a "non-distributed tone plan"). Distributed transmissions provide greater flexibility in medium utilization for power spectral density (PSD)-limited wireless channels. As described above, the low power indoor (LPI) power class limits the transmit power of APs and STAs in the 6 GHz band to 5 dBm/MHz and −1 dBm/MHz, respectively. By allowing a wireless communication device to distribute the tones allocated for the transmission of a PPDU across noncontiguous subcarrier indices of a wireless channel, distributed transmissions may increase the overall transmit power of the PPDU without exceeding the PSD limits of the wireless channel. For example, a distributed tone plan may reduce the total number of tones modulated by the device on any 1-MHz subchannel of the wireless channel. As a result, the wireless communication device may increase its per-tone transmit power without exceeding the PSD limits.

The IEEE 802.11 standard defines a PPDU format, to be used for wireless communication, which includes one or more short training fields (STFs). STFs are generally used for automatic gain control (AGC) and carrier frequency (DC) estimation at a receiving device. For example, a transmitting device may transmit a known pattern of symbols, in an STF, to the receiving device. The receiving device may use its knowledge of the symbol pattern and its periodicity in the received STF (also referred to as an "STF sequence") to estimate the power of the received signals and perform DC estimation. Further, the receiving device may dynamically adjust the gain of its amplifiers based on the estimated power of the STF and correct the DC of the received signals to ensure more accurate reception of the data portion of the PPDU. Existing versions of the IEEE 802.11 standard define various STF sequences and tone plans (also referred to as "existing STF tone plans") associated with various PPDU formats and bandwidths. According to existing versions of the IEEE 802.11 standard, rRUs are transmitted over respective bandwidths (or sub-bands) allocated exclusively for the rRUs, and an STF associated with each rRU is transmitted over the STF tones within that rRU. However, in distributed transmissions, multiple dRUs can be transmitted on interleaved tones of a shared bandwidth (also referred to as the "spreading bandwidth" or "distribution bandwidth"). Because the STF is used to estimate the signal power of the modulated tones, changing the tone plan used for PPDU transmissions (such as from a non-distributed tone plan to a distributed tone plan) may require new dRU-related signaling and STF designs.

Various aspects relate generally to distributed transmissions, and more particularly, to STF designs and signaling that support distributed transmissions. In some aspects, a transmitting device may transmit data on a dRU and may transmit an STF sequence over a spreading bandwidth of the dRU according to an existing STF tone plan. Thus, in a trigger-based (TB) PPDU, wireless stations (STAs) that are assigned dRUs in the same spreading bandwidth may transmit the same STF sequence on the same set of tones. In some implementations, each STA that is allocated a dRU for transmission in a TB PPDU may map its STF sequence to one or more spatial streams and may apply one or more global cyclic shift delays (CSDs) to the STF sequence mapped to the one or more spatial streams, respectively. As used herein, the term "global CSD" refers to CSD assignments that account for a position of each STA associated with a PPDU. For example, different global CSDs may be assigned to different STAs so that each STA transmits its STF sequence with different amounts of delay. In some implementations, each STA may randomly generate its global CSD values. In some other implementations, each STA may select its global CSD values from a CSD table based on information assigned to the STA (such as an association identifier (AID) value or an RU index, an RU assignment index, or a start tone offset associated with the dRU). Still further, in some implementations, each STA may receive an indication of its global CSD index or values in a trigger frame soliciting the TB PPDU. In some aspects, the trigger frame may carry distributed transmission information indicating which STAs are allocated dRUs for transmission in the TB PPDU and may carry dRU distribution bandwidth information indicating the spreading bandwidths associated with the dRUs.

Particular implementations of the subject matter described in this disclosure can be implemented to realize one or more of the following potential advantages. As described above, transmitting the data portion of a PPDU on noncontiguous tones of a wireless channel allows the transmitting device to increase the overall transmit power of the data without exceeding the PSD limits of the wireless channel. Transmitting the STF of the PPDU over the spreading bandwidth of the dRU allows a receiving device to more accurately estimate the power of the received signals associated with the data portion. By reusing existing STF tone plans, aspects of the present disclosure may support AGC for distributed transmissions with only minor changes to the IEEE 802.11 standard. However, aspects of the present disclosure recognize that unintentional beamforming may result from multiple STAs concurrently transmitting the same STF sequence on the same set of tones (such as in a TB PPDU). For example, such superimposed STF transmissions may constructively, or destructively, interfere at the receiving device, causing the receiving device to obtain inaccurate power measurements for the received signals. By applying global CSDs to the STF sequence transmitted by each STA on each spatial stream, aspects of the present disclosure may decouple the STF transmissions from multiple STAs in the time domain. More specifically, the global CSDs may stagger the phases of the STF transmissions across different STAs and different spatial streams, thereby preventing or reducing unintentional beamforming at the receiving device.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
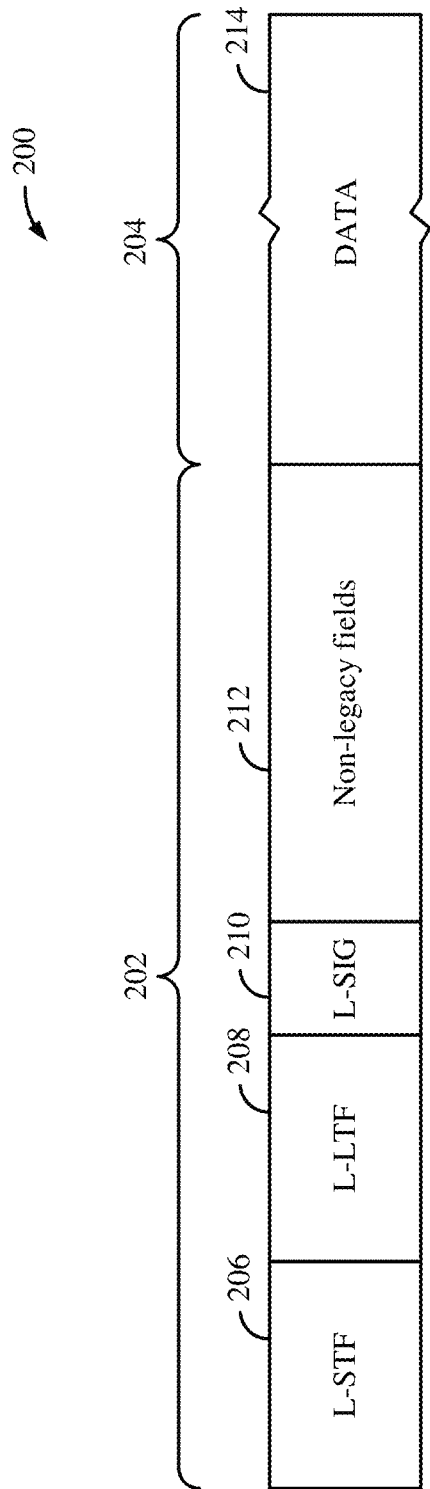
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
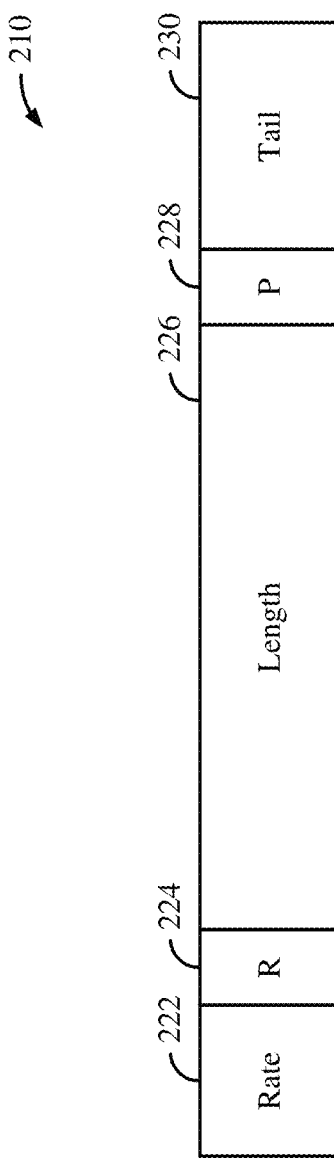
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
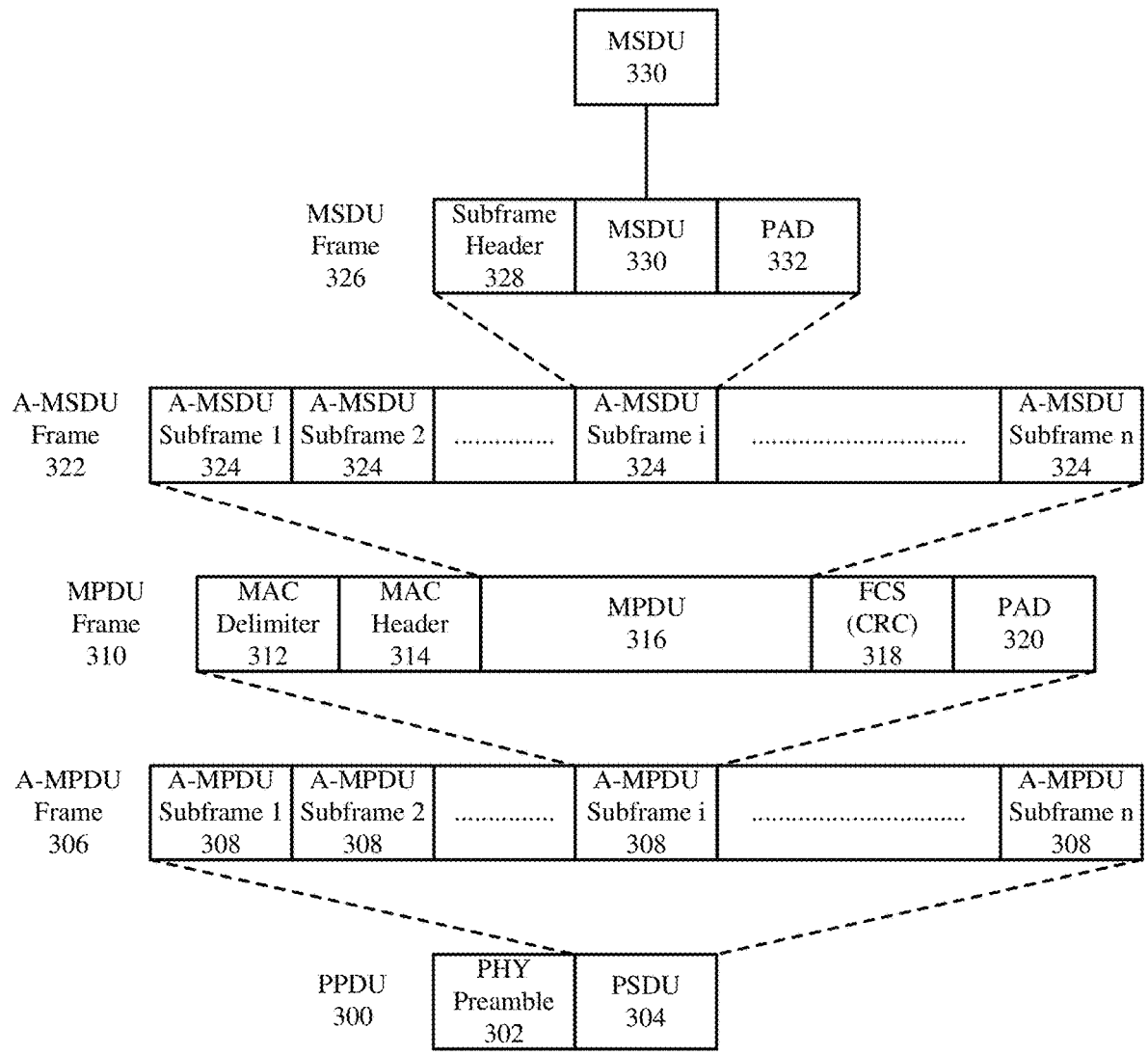
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
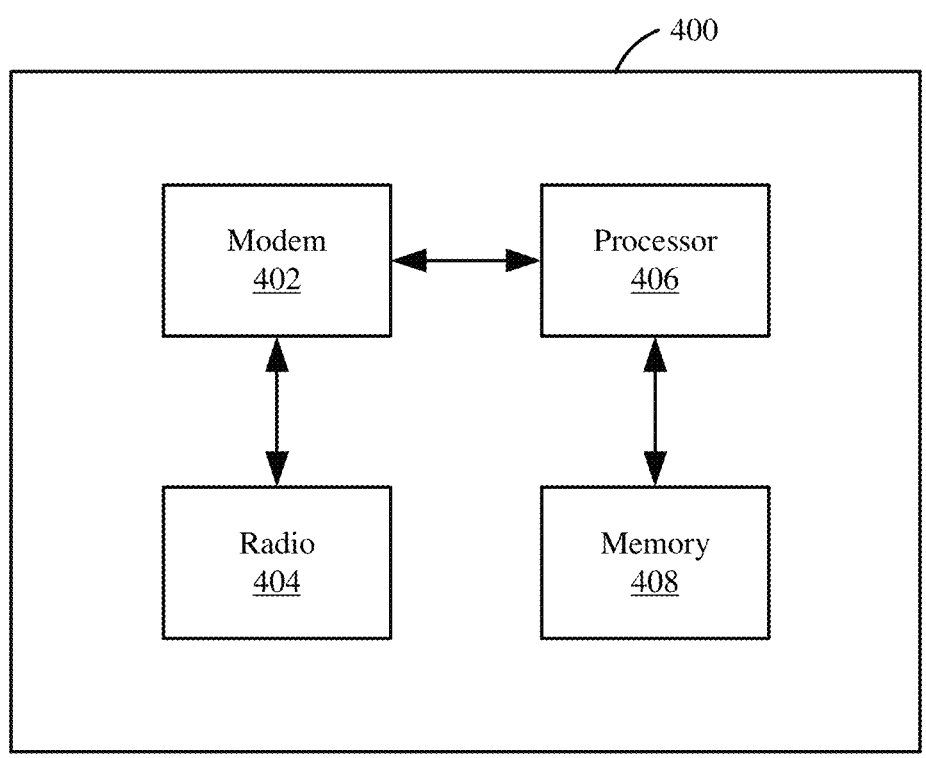
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for UQ imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
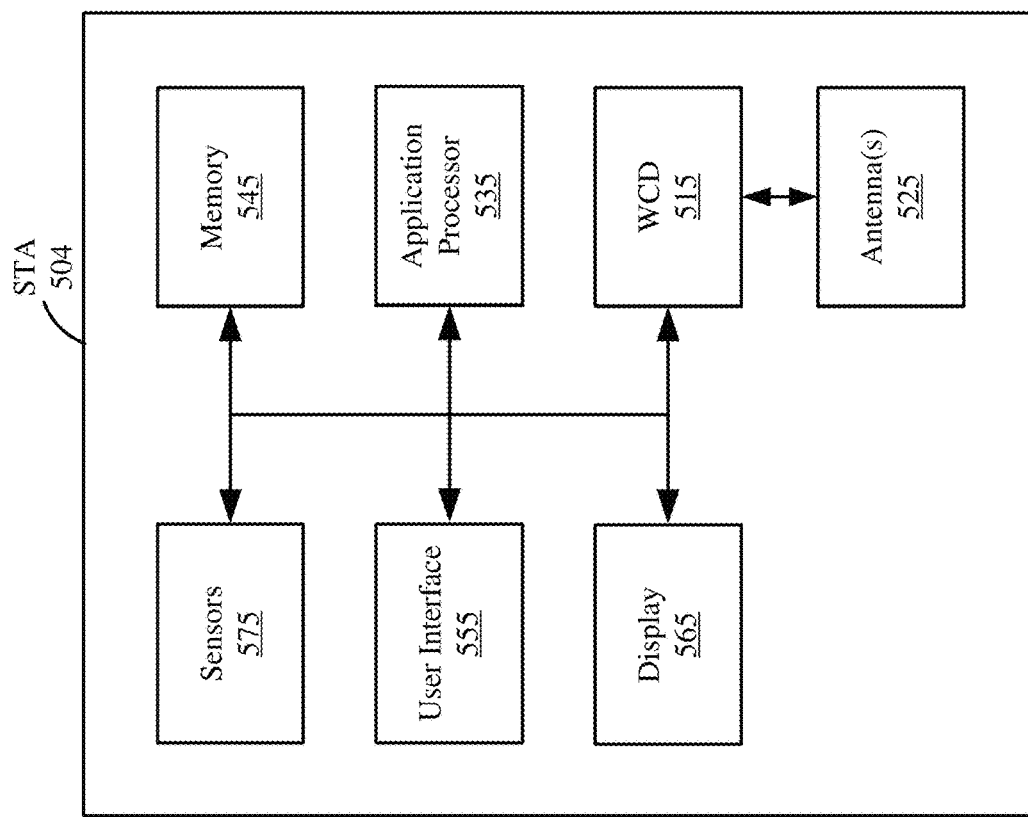
FIG. 5B shows a block diagram of an example STA.
Figure 5A:
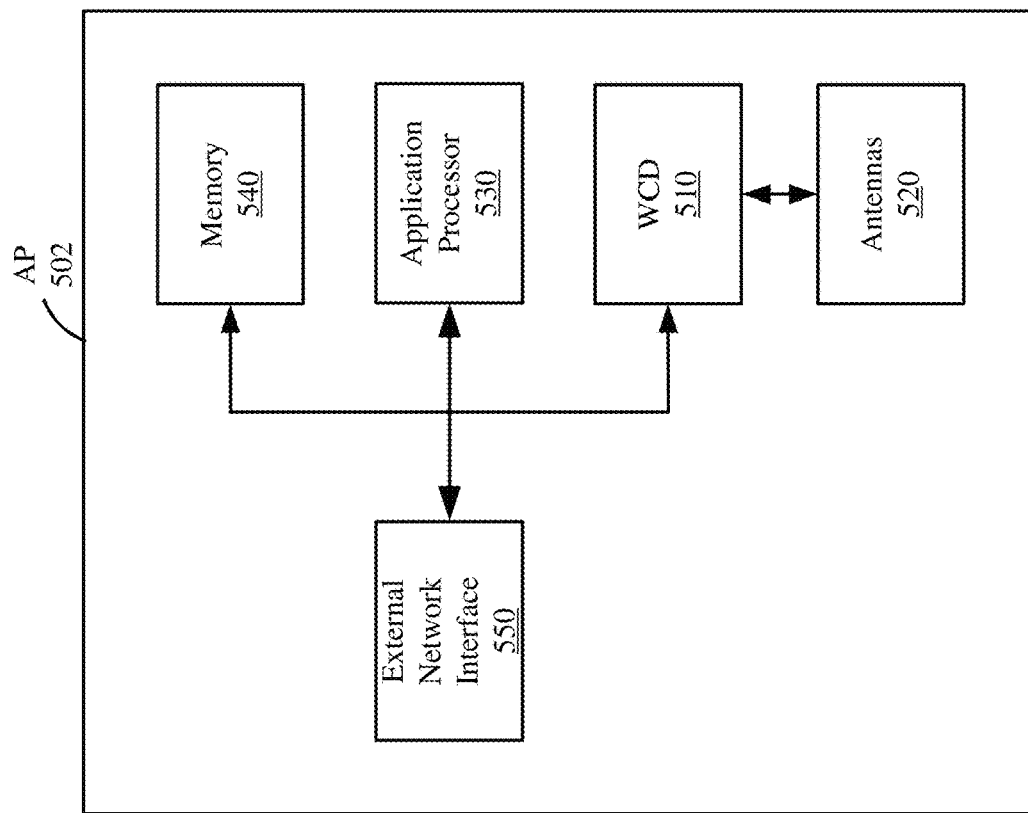
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, the term "distributed transmission" refers to the transmission of a PPDU on noncontiguous tones (or subcarriers) of a wireless channel (such as in accordance with a "distributed tone plan"). Such noncontiguous tones represent a dRU. In contrast, an rRU is any set of contiguous tones defined by existing versions of the IEEE 802.11 standard (also referred to as a "non-distributed tone plan"). Distributed transmissions provide greater flexibility in medium utilization for PSD-limited wireless channels. As described above, the LPI power class limits the transmit power of APs and STAs in the 6 GHz band to 5 dBm/MHz and −1 dBm/MHz, respectively. By allowing a wireless communication device to distribute the tones allocated for the transmission of a PPDU across noncontiguous subcarrier indices of a wireless channel, distributed transmissions may increase the overall transmit power of the PPDU without exceeding the PSD limits of the wireless channel. For example, a distributed tone plan may reduce the total number of tones modulated by the device on any 1-MHz subchannel of the wireless channel. As a result, the wireless communication device may increase its per-tone transmit power without exceeding the PSD limits.

Various aspects relate generally to distributed transmissions, and more particularly, to STF designs and signaling that support distributed transmissions. In some aspects, a transmitting device may transmit data on a dRU and may transmit an STF sequence over a spreading bandwidth of the dRU according to an existing STF tone plan. Thus, in a TB PPDU, STAs that are assigned dRUs in the same spreading bandwidth may transmit the same STF sequence on the same set of tones. In some implementations, each STA that is allocated a dRU for transmission in a TB PPDU may map its STF sequence to one or more spatial streams and may apply one or more global CSDs to the STF sequence mapped to the one or more spatial streams, respectively. As used herein, the term "global CSD" refers to CSD assignments that account for a position of each STA associated with a PPDU. For example, different global CSDs may be assigned to different STAs so that each STA transmits its STF sequence with different amounts of delay. In some implementations, each STA may randomly generate its global CSD values. In some other implementations, each STA may select its global CSD values from a CSD table based on information assigned to the STA (such as an AID value or an RU index, an RU assignment index, or a start tone offset associated with the dRU). Still further, in some implementations, each STA may receive an indication of its global CSD index or values in a trigger frame soliciting the TB PPDU. In some aspects, the trigger frame may carry distributed transmission information indicating which STAs are allocated dRUs for transmission in the TB PPDU and may carry dRU distribution bandwidth information indicating the spreading bandwidths associated with the dRUs.

Particular implementations of the subject matter described in this disclosure can be implemented to realize one or more of the following potential advantages. As described above, transmitting the data portion of a PPDU on noncontiguous tones of a wireless channel allows the transmitting device to increase the overall transmit power of the data without exceeding the PSD limits of the wireless channel. Transmitting the STF of the PPDU over the spreading bandwidth of the dRU allows a receiving device to more accurately estimate the power of the received signals associated with the data portion. By reusing existing STF tone plans, aspects of the present disclosure may support AGC for distributed transmissions with only minor changes to the IEEE 802.11 standard. However, aspects of the present disclosure recognize that unintentional beamforming may result from multiple STAs concurrently transmitting the same STF sequence on the same set of tones (such as in a TB PPDU). For example, such superimposed STF transmissions may constructively, or destructively, interfere at the receiving device, causing the receiving device to obtain inaccurate power measurements for the received signals. By applying global CSDs to the STF sequence transmitted by each STA on each spatial stream, aspects of the present disclosure may decouple the STF transmissions from multiple STAs in the time domain. More specifically, the global CSDs may stagger the phases of the STF transmissions across different STAs and different spatial streams, thereby preventing or reducing unintentional beamforming at the receiving device.

Figure 6:
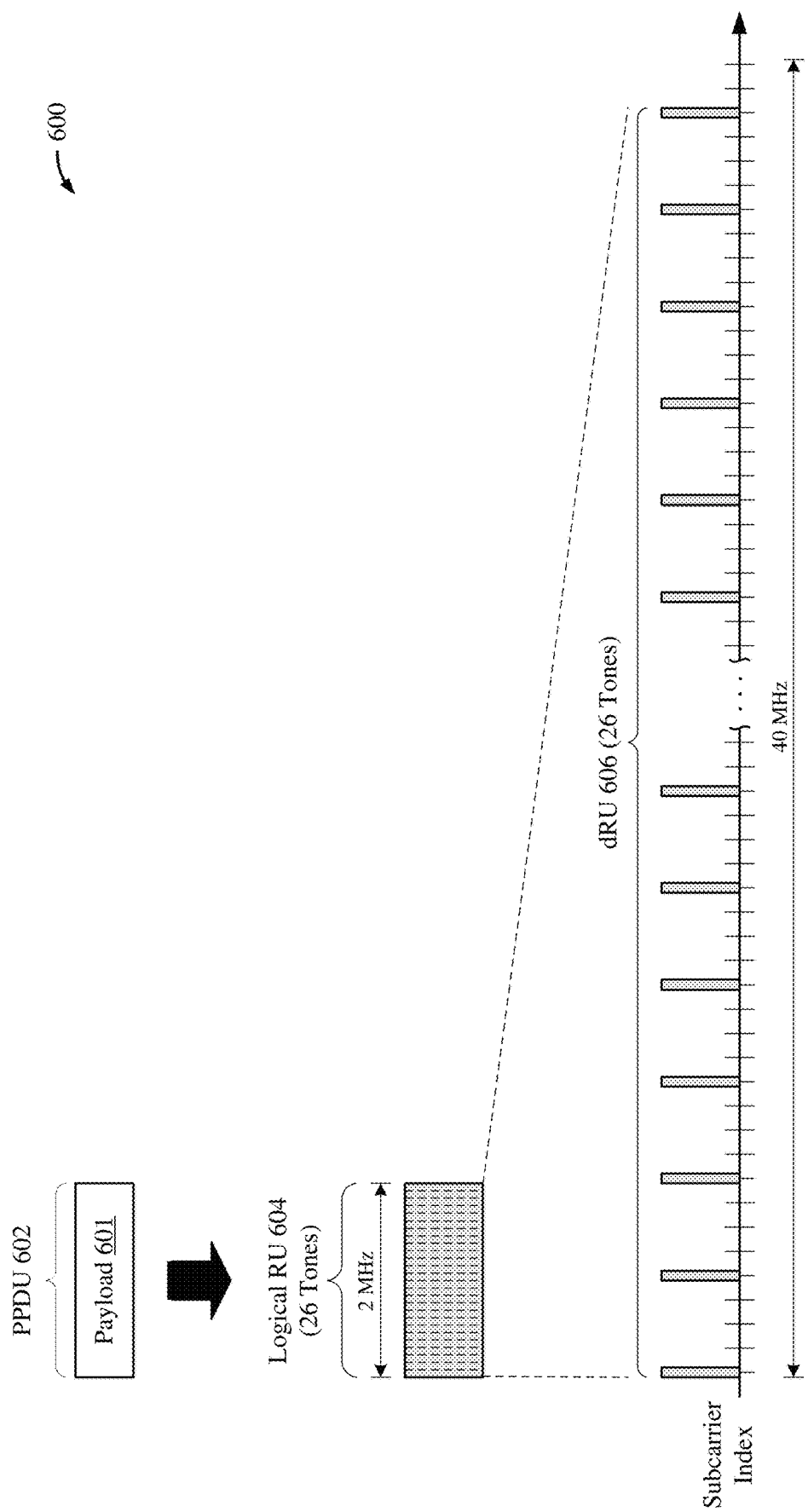
FIG. 6 shows a frequency diagram depicting an example distributed tone mapping according to some implementations.

FIG. 6 shows a frequency diagram 600 depicting an example distributed tone mapping according to some implementations. More specifically, FIG. 6 shows an example mapping of a payload 601 of a PPDU 602 to a set of tones or subcarriers for transmission over a wireless channel. In some implementations, the payload 601 may be modulated on a logical RU 604 associated with a non-distributed tone plan (such as a legacy tone plan or a non-legacy tone plan) and further mapped to a dRU 606 in accordance with a distributed tone plan. The logical RU 604 represents a number of tones or subcarriers that are allocated for the transmission of the PPDU 602. In contrast, the dRU 606 represents the physical resources (identified by subcarrier indices) that are modulated to transmit the PPDU 602. As used herein, the term "distributed RU" or dRU refers to any logical RU that is distributed across a set of noncontiguous subcarrier indices, and the term "distributed tone plan" refers to the set of noncontiguous subcarrier indices associated with a dRU.

Existing versions of the IEEE 802.11 standard define a number of RUs and multiple RUs (MRUs) of various sizes that map to contiguous tones or subcarriers spanning a frequency bandwidth (or wireless channel). For example, a 242-tone RU maps to 242 contiguous subcarrier indices spanning a 20 MHz bandwidth. Similarly, a 484+242-tone MRU maps to 484 contiguous subcarrier indices spanning a 40 MHz bandwidth and to 242 contiguous subcarrier indices spanning a 20 MHz bandwidth. As used herein, the term "regular RU" or rRU refers to any RU or MRU configuration that is supported by existing versions of the IEEE 802.11 standard (up to, and including, the IEEE 802.11be amendment of the IEEE 802.11 standard), and the term "non-distributed tone plan" refers to any tone plan defined by existing versions of the IEEE 802.11 standard. Further, the term "legacy" is used herein to refer to PPDU formats and communication protocols conforming to the IEEE 802.11ax amendment, or earlier versions, of the IEEE 802.11 standard. For example, a "legacy tone plan" may be any non-distributed tone plan supported by the IEEE 802.11ax amendment. In contrast, the term "non-legacy" is used herein to refer to PPDU formats and communication protocols conforming to the IEEE 802.11be amendment, and future generations, of the IEEE 802.11 standard. For example, a "non-legacy tone plan" may be any non-distributed tone plan supported by the IEEE 802.11be amendment.

In some implementations, the logical RU 604 may represent an rRU as defined by existing versions of the IEEE 802.11 standard. In other words, the logical RU 604 maps directly to a respective rRU according to a non-distributed tone plan. In the example of FIG. 6, the logical RU 604 includes 26 tones. Thus, in accordance with a non-distributed tone plan, the logical RU 604 would map directly to 26 contiguous or consecutive subcarrier indices spanning a 2 MHz subchannel. However, when mapped to an rRU, the transmit power of the logical RU 604 may be severely limited based on the PSD of the wireless channel. For example, the LPI power class limits the transmit power of APs and STAs to 5 dBm/MHz and −1 dBm/MHz, respectively, in the 6 GHz band. As such, the per-tone transmit power of the logical RU 604 is limited by the number of tones mapped to each 1 MHz subchannel of the wireless channel. Accordingly, each 1 MHz subchannel of a PSD-limited channel may be referred to herein as a "PSD-limited subchannel."

Aspects of the present disclosure recognize that the per-tone transmit power of the logical RU 604 can be increased by distributing the tones across a wider bandwidth. Increasing the per-tone transmit power can also increase the overall transmit power of the logical RU 604. Thus, in some implementations, the logical RU 604 may be mapped to a set of noncontiguous subcarrier indices spanning a wider-bandwidth channel (referred to herein as a "spreading bandwidth" or "distribution bandwidth"). With reference for example to FIG. 6, the logical RU 604 is mapped to the dRU 606 according to a distributed tone plan. More specifically, the logical RU 604 is mapped to 26 noncontiguous subcarrier indices spread across a 40 MHz wireless channel (where the spreading bandwidth is equal to 40 MHz). Compared to the tone mapping described above with respect to the non-distributed tone plan, the distributed tone mapping depicted in FIG. 6 effectively reduces the number of tones (of the logical RU 604) in each 1 MHz subchannel. For example, each of the 26 tones can be mapped to a different 1 MHz subchannel of the 40 MHz channel. As a result, each AP or STA implementing the distributed tone mapping of FIG. 6 can maximize its per-tone transmit power (which may maximize the overall transmit power of the logical RU 604).

In some implementations, a transmitting device (such as a STA or an AP) may include a distributed tone mapper that maps the logical RU 604 to the dRU 606 in the frequency domain (such as described with reference to FIG. 6). The dRU 606 is then converted to a time-domain signal (such as by an inverse fast Fourier transform (IFFT)) for transmission over a wireless channel. A receiving device (such as an AP or a STA) receives the time-domain signal over the wireless channel and converts the time-domain signal back to the dRU 606 (such as by a fast Fourier transform (FFT)). In some implementations, the receiving device may include a distributed tone demapper that demaps the dRU 606 to the logical RU 604. In other words, the distributed tone demapper reverses the mapping performed by the distributed tone mapper at the transmitting device. The receiving device can then recover the information carried (or modulated) on the logical RU 604 as a result of the demapping.

In the example of FIG. 6, the logical RU 604 is distributed evenly across a 40 MHz wireless channel. However, in actual implementations, the logical RU 604 can be mapped to any suitable pattern of noncontiguous subcarrier indices. For example, in some aspects, the distance between any pair of modulated tones may be different (such as less or greater) than the distances depicted in FIG. 6. Still further, in some aspects, multiple logical RUs may be mapped to interleaved subcarrier indices of a shared wireless channel.

Figure 7:
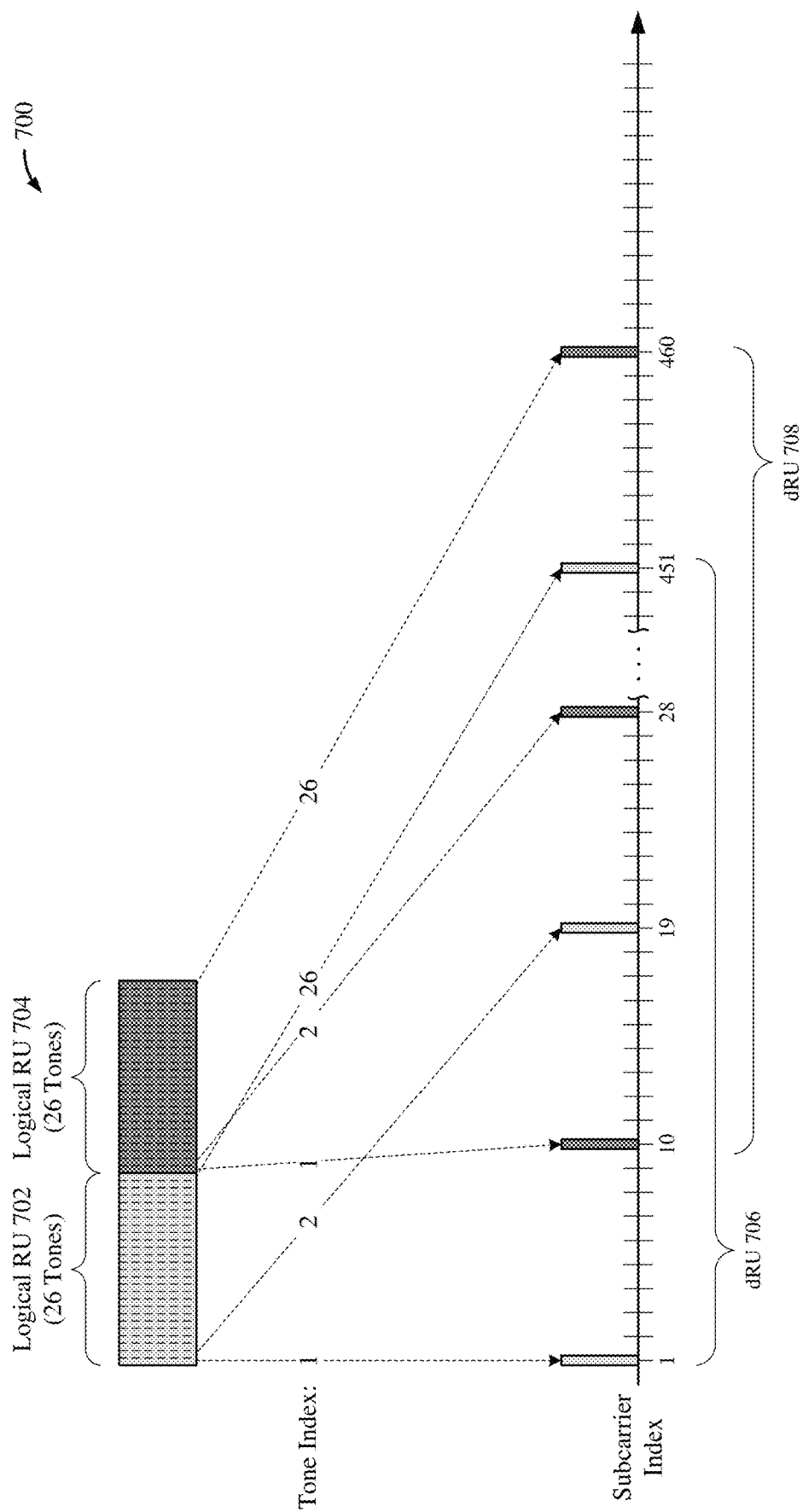
FIG. 7 shows a frequency diagram depicting an example mapping of logical resource unit (RUs) to distributed RU (dRUs), respectively, according to some implementations.

FIG. 7 shows a frequency diagram depicting an example mapping of logical RUs 702 and 704 to dRUs 706 and 708, respectively, according to some implementations. In some implementations, each of the logical RUs 702 and 704 may carry user data for a respective AP or STA (not shown for simplicity).

In the example of FIG. 7, each of the logical RUs 702 and 704 includes 26 tones and the spreading bandwidth is equal to 40 MHz. In some implementations, the logical RUs 702 and 704 are mapped to the dRUs 706 and 708, respectively, according to a distributed tone plan. More specifically, the 26 tones associated with each of the logical RUs 702 and 704 is mapped to a respective set of 26 noncontiguous subcarrier indices spread across a 40 MHz wireless channel. In some implementations, the distributed tone plan maps the 26 tones of the first logical RU 702 to every $18^{th}$ subcarrier index starting at subcarrier index 1 and maps the 26 tones of the second logical RU 704 to every $18^{th}$ subcarrier index starting at subcarrier index 10. As a result, the first dRU 706 includes every $18^{th}$ tone modulated on subcarrier indices 1 through 451, and the second dRU 708 includes every $18^{th}$ tone modulated on subcarrier indices 10 through 460.

As shown in FIG. 7, the first tone of the logical RU 702 (tone_idx=1) is mapped to subcarrier index 1, the second tone of the logical RU 702 (tone_idx=2) is mapped to subcarrier index 19, and the mapping pattern continues until the $26^{th}$ tone of the logical RU 702 (tone_idx=26) is mapped to subcarrier index 451. Similarly, the first tone of the logical RU 704 (tone_idx=1) is mapped to subcarrier index 10, the second tone of the logical RU 704 (tone_idx=2) is mapped to subcarrier index 28, and the mapping pattern continues until the $26^{th}$ tone of the logical RU 704 (tone_idx=26) is mapped to subcarrier index 460. Thus, as shown in FIG. 7, the distributed tone plan interleaves the logical RUs 702 and 704, offset by 9 subcarrier indices, across the dRU spreading bandwidth. Aspects of the present disclosure recognize that, by interleaving the dRUs 706 and 708, the per-tone transmit power of each dRU can be significantly increased without sacrificing spectral efficiency.

Aspects of the present disclosure recognize that new packet designs are needed to support distributed transmissions. For example, existing versions of the IEEE 802.11 standard define a PPDU format that includes a PHY preamble followed by a payload. As described with reference to FIGS. 6 and 7, the payload may be transmitted on a dRU to achieve increased transmit power. The PHY preamble includes one or more STFs which may be used for AGC or DC estimation at a receiving device. For example, a transmitting device may transmit a known pattern of symbols, in an STF, to the receiving device. The receiving device may use its knowledge of the symbol pattern and its periodicity in the received STF (also referred to as an "STF sequence") to estimate the power of the received signals and perform DC estimation. Further, the receiving device may dynamically adjust the gain of its amplifiers based on the estimated power of the STF and correct the DC of the received signals to ensure more accurate reception of the data portion of the PPDU. Existing versions of the IEEE 802.11 standard define various STF sequences and tone plans (also referred to as "existing STF tone plans") associated with various PPDU formats and bandwidths. According to existing versions of the IEEE 802.11 standard, rRUs are transmitted over respective bandwidths (or sub-bands) allocated exclusively for the rRUs, and an STF associated with each rRU is transmitted over the STF tones within that rRU. However, as shown in FIG. 7, multiple dRUs can be transmitted on interleaved tones of a shared bandwidth. Because the STF is used to estimate the signal power of the modulated tones, changing the tone plan used for PPDU transmissions (such as from a non-distributed tone plan to a distributed tone plan) may require new dRU-related signaling and STF designs.

Figure 8:
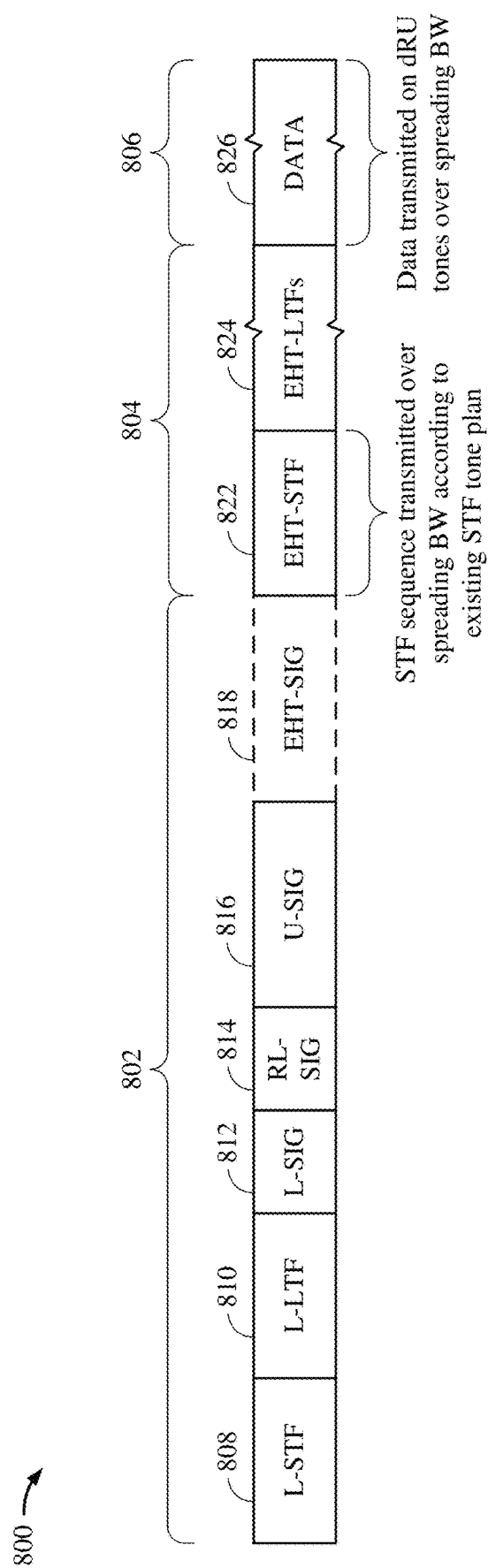
FIG. 8 shows an example PPDU usable for communications between an AP and one or more STAs according to some implementations.

FIG. 8 shows an example PPDU 800 usable for communications between an AP and one or more STAs according to some implementations. In some implementations, the PPDU 800 may be one example of the PPDU 602 of FIG. 6. The PPDU 800 includes a PHY preamble including a first portion 802 and a second portion 804. The PPDU 800 may further include a PHY payload 806 after the preamble, for example, in the form of a PSDU carrying a DATA field 826. In some implementations, the PPDU 800 may be formatted as a non-legacy or Extremely High Throughput (EHT) PPDU.

The first portion 802 of the PHY preamble includes L-STF 808, L-LTF 810, L-SIG 812, a repeated legacy signal field (RL-SIG) 814, and a universal signal field (U-SIG) 816. In some implementations, the first portion 804 of the PHY preamble may further include a non-legacy signal field (EHT-SIG) 818. With reference to the IEEE 802.11be amendment of the IEEE 802.11 standard, the first portion 802 may be referred to as a "pre-EHT modulated portion" of the PPDU 800. The second portion 804 of the PHY preamble includes a non-legacy short training field (EHT-STF) 822 and a number of non-legacy long training fields (EHT-LTFs) 824. With reference to the IEEE 802.11be amendment of the IEEE 802.11 standard, the second portion 804, together with the PHY payload 806, may be referred to as the "EHT modulated portion" of the PPDU 800.

With reference for example to FIG. 6, the PHY payload 806 may be one example of the payload 601. The PHY payload 806 may be modulated on a logical RU that is further mapped to a dRU, for example, to achieve gains in transmit power. As described with reference to FIGS. 6 and 7, the tones of the dRU are distributed across noncontiguous subcarrier indices associated with a wireless channel. The bandwidth of the wireless channel is referred to as the spreading bandwidth (BW) or "distribution bandwidth." To achieve a noncontiguous tone distribution, the bandwidth of the logical RU on which the PHY payload 806 is modulated must be smaller than the spreading bandwidth. For example, as shown in FIG. 6, the payload 601 is modulated on a 26-tone logical RU 604 having a bandwidth of approximately 2 MHz, and the tones of the logical RU 604 are further distributed across 26 noncontiguous subcarrier indices associated with the 40 MHz spreading bandwidth.

The EHT-STF 822 carries a sequence of values (or STF sequence) that is used for AGC at a receiving device. More specifically, the receiving device measures the power of the received STF signals and adjusts the gain of its amplifiers to more accurately receive the PHY payload 806 based on the measured power of the EHT-STF 822. Thus, in some aspects, the EHT-STF 822 also may be transmitted across the spreading bandwidth of the dRU. Existing versions of the IEEE 802.11 standard define an STF tone plan that maps the values of the STF sequence to respective tones associated with a wireless channel. For example, the existing STF tone plan associated with a TB PPDU modulates every $8^{th}$ tone in the wireless channel with a respective STF value. In some implementations, the EHT-STF 822 may be mapped to a series of tones spanning the spreading bandwidth in accordance with an existing STF tone plan. In other words, distributed transmissions may reuse existing EHT-STF sequence that are mapped to respective tones in the spreading bandwidth according to an existing STF tone plan.

Figure 9:
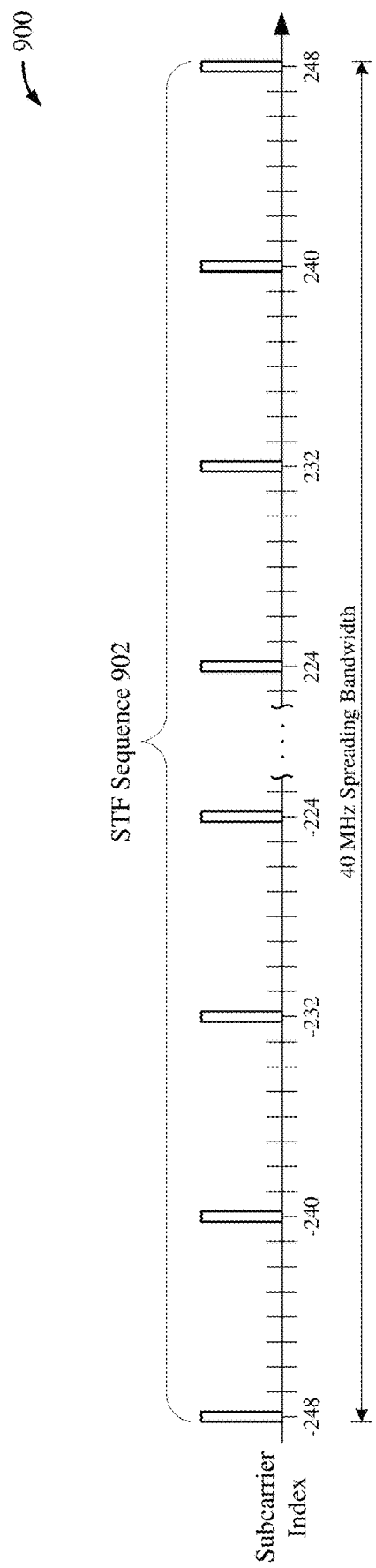
FIG. 9 shows a frequency diagram depicting an example short training field (STF) sequence usable for automatic gain control (AGC) in distributed transmissions.

FIG. 9 shows a frequency diagram 900 depicting an example STF sequence 902 usable for AGC in distributed transmissions. In some implementations, the STF sequence 902 may be one example of the EHT-STF 822 of FIG. 8. In the example of FIG. 9, the STF sequence 902 is mapped to a 40 MHz spreading bandwidth according to an existing STF tone plan defined for TB PPDUs. In some implementations, the STF sequence 902 may be an existing STF sequence defined for a 484-tone rRU. As shown in FIG. 9, the values of the STF sequence 902 are mapped to every $8^{th}$ subcarrier index in a range of subcarrier indices from −248 to 248 (centered around DC) spanning the 40 MHz spreading bandwidth. As shown in FIG. 9, the $1^{st}$ value of the STF sequence 902 is modulated on subcarrier index −248, the $2^{nd}$ value of the STF sequence 902 is modulated on subcarrier index −240, the $3^{rd}$ value of the STF sequence 902 is modulated on subcarrier index −232, and the mapping is repeated until the last value of the STF sequence 902 is mapped to subcarrier index 248.

Aspects of the present disclosure recognize that, by defining each STF sequence and tone mapping scheme for a given spreading bandwidth, the same STF sequence may be transmitted (on the same set of tones) by multiple STAs assigned to different dRUs that are allocated for transmission within the same spreading bandwidth. With reference for example to FIG. 7, the STF sequence 902 may be transmitted by a first STA assigned to the dRU 706 and also may be transmitted by a second STA assigned to the dRU 708. In some aspects, the first and second STAs may concurrently transmit the STF sequence 902 to a receiving device (such as in a TB PPDU), which may result in unintentional beamforming at the receiving device. For example, the receiving device may receive multiple copies of the STF sequence 902 that are superimposed on one another. However, random phase from each transmitter of the first and second STAs may cause the received signals to constructively, or destructively, interfere with one another, which is most prominent when they have the same channel response (such as additive white gaussian noise (AWGN)). As a result, the measured power associated with the STF may be significantly higher or lower than the actual power associated with any of the dRUs 706 or 708.

Figure 10:
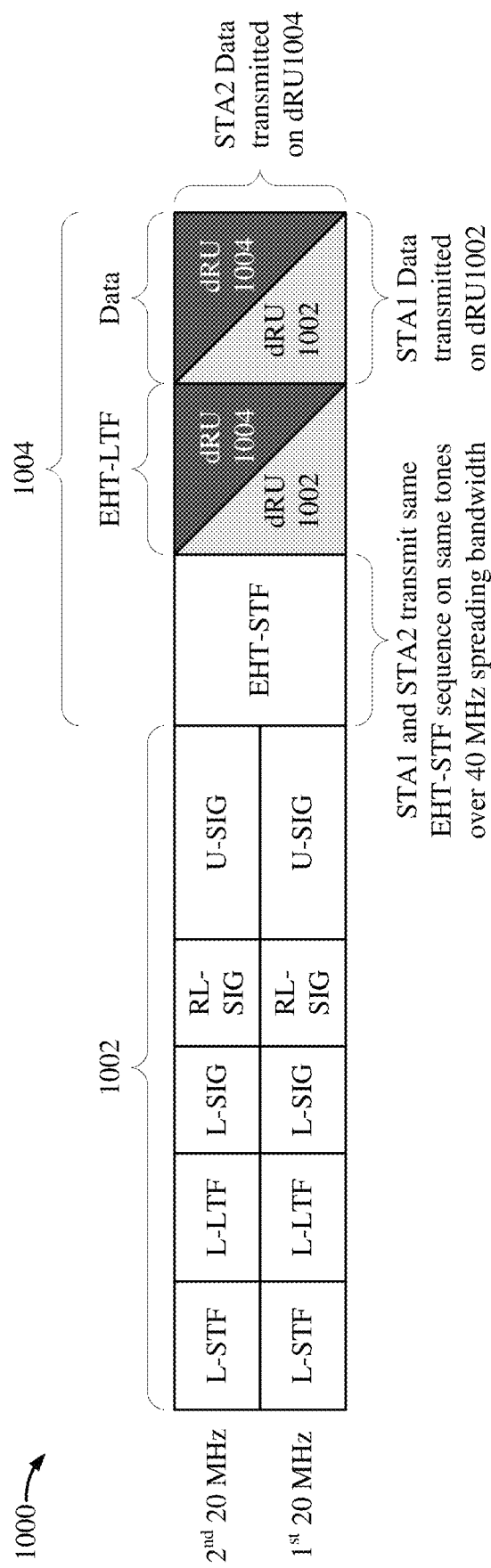
FIG. 10 shows an example frame structure of a trigger-based (TB) PPDU according to some implementations.

FIG. 10 shows an example frame structure of a TB PPDU 1000 according to some implementations. The TB PPDU 1000 includes a pre-EHT modulated portion 1002 followed by an EHT modulated portion 1004. The pre-EHT modulated portion 1002 includes an L-STF, an L-LTF, an L-SIG, an RL-SIG, and a U-SIG. The EHT modulated portion 1004 includes an EHT-STF, an EHT-LTF, and a data portion. In some implementations, the TB PPDU 1000 may be one example of the PPDU 800 of FIG. 8 (excluding the EHT-SIG 818).

In the example of FIG. 10, the TB PPDU 1000 may be transmitted over a 40 MHz bandwidth. To ensure proper packet detection and backwards compatibility with wireless communication devices that conform to existing versions of the IEEE 802.11 standard, the pre-EHT modulated portion 1002 of the TB PPDU 1000 may be duplicated on each 20 MHz sub-band of the 40 MHz bandwidth. For example, the information carried in L-STF, L-LTF, L-SIG, RL-SIG, and U-SIG may be transmitted on the $1^{st}$ 20 MHz sub-band and the same information may be duplicated on the $2^{nd}$ 20 MHz sub-band.

In contrast, the EHT modulated portion 1004 may be configured for transmission over the 40 MHz bandwidth as a whole. For example, a first data portion of the TB PPDU 1000 may be assigned to a first dRU 1002 mapped to the 40 MHz bandwidth and a second data portion of the TB PPDU 1000 may be assigned to a second dRU 1004 mapped to the 40 MHz bandwidth. In some implementations, the dRUs 1002 and 1004 may be examples of the dRUs 702 and 704, respectively, of FIG. 7. Thus, the dRUs 1002 and 1004 may be transmitted on interleaved tones within the same 40 MHz spreading bandwidth.

In some implementations, the first dRU 1002 may be assigned to a first STA (STA1) and the second dRU 1004 may be assigned to a second STA (STA2). In other words, STA1 may transmit its data on dRU 1002 in the first data portion of the TB PPDU 1000 and STA2 may transmit its data on dRU 1004 in the second data portion of the TB PPDU 1000. The EHT-LTFs carry a sequence of values (also referred to as an "LTF sequence") that is used for channel estimation at the receiving device. As such, the EHT-LTFs may be transmitted on the same tones as the data portion of the TB PPDU 1000. For example, STA1 may transmit an LTF sequence on dRU 1002 in the EHT-LTF of the TB PPDU 1000 and STA2 may transmit an LTF sequence on dRU 1004 in the EHT-LTF of the TB PPDU. In some aspects, the EHT-STF may carry an existing STF sequence associated with a 40 MHz bandwidth (such as shown in FIG. 9). As such, STA1 and STA2 may transmit the same STF sequence on the same set of tones in the EHT-STF of the TB PPDU 1000.

In some aspects, STA1 and STA2 may each transmit a respective portion of the TB PPDU 1000 over one or more spatial streams. For example, STA1 may transmit its portion of the TB PPDU 1000 (including EHT-STF and the EHT modulated portion 1004 mapped to dRU 1002) on a number (m) of spatial streams. In some implementations, STA1 may apply m CSDs to the portion of the TB PPDU 1000 mapped to the m spatial streams, respectively, to avoid unintentional beamforming across the m spatial streams at the receiving device. Similarly, STA2 may transmit its portion of the TB PPDU 1000 (including EHT-STF and the EHT modulated portion 1004 mapped to dRU 1004) on a number (n) of spatial streams. In some implementations, STA2 may apply n CSDs to the portion of the TB PPDU 1000 mapped to the n spatial streams, respectively, to avoid unintentional beamforming across the n spatial streams at the receiving device.

Aspects of the present disclosure recognize that, because the dRUs 1002 and 1004 are separated in frequency, local CSDs may be sufficient to overcome unintentional beamforming in the EHT-LTF and data portions of the TB PPDU 1000. In other words, STA1 may apply its m CSDs "locally" or without regard for the n CSDs applied by STA2. Unintentional beamforming may be avoided in the EHT-LTF and data portions of the TB PPDU 1000 even if the m CSDs applied to the EHT-LTF and data portions mapped to the m spatial streams are equal to (or a subset or superset of) the n CSDs applied to the EHT-LTF and data portions mapped to the n spatial streams.

However, because STA1 and STA2 transmit the EHT-STF of the TB PPDU 1000 on the same set of tones, unintentional beamforming may still occur across the m+n spatial streams if STA1 and STA2 only apply local CSDs to their respective spatial streams. For example, if the m CSDs applied to the EHT-STF mapped to the m spatial streams are equal to (or a subset or superset of) the n CSDs applied to the EHT-STF mapped to the n spatial streams, unintentional beamforming may still occur in the EHT-STF of the TB PPDU 1000 as a result of cross-correlation between the m spatial streams transmitted by STA1 and the n spatial streams transmitted by STA2.

In some aspects, each STA that is assigned a dRU for transmission in a TB PPDU may apply one or more global CSDs to the EHT-STF of the TB PPDU mapped to one or more spatial streams, respectively. As described above, global CSDs account for the position of each STA associated with a TB PPDU. For example, the global CSD values assigned to each STA associated with a TB PPDU may be different than the global CSD values assigned to any other STAs associated with the TB PPDU. With reference for example to FIG. 10, STA1 may apply m global CSD values to the EHT-STF mapped to the m spatial streams, respectively, and STA 2 may apply n global CSD values to the EHT-STF mapped to the n spatial streams, respectively, resulting in a different CSD being applied to the EHT-STF mapped to each of the m+n spatial streams. Accordingly, global CSDs effectively decouple the EHT-STF transmissions from multiple STAs in the time domain, thereby avoiding unintentional beamforming at the receiving device.

In some implementations, global CSDs may be applied to the entire EHT modulated portion 1004 of the TB PPDU 1000. In such implementations, the transmitting device may apply the same phase slope (or the same CSD values) to EHT-STF, EHT-LTF, and the data portion of the TB PPDU 1000, which may simplify the implementation of the transmitter of the TB PPDU 1000. In some implementations, applying global CSDs to EHT-LTF may help reduce the receiver side peak-to-average power ratio (PAPR) or resolve unintentional beamforming issues associated with the transmission of the EHT-LTF. However, aspects of the present disclosure also recognize that existing versions of the IEEE 802.11 standard only support the use of local CSDs in the transmission and reception of EHT-LTF and data in a TB PPDU with UL OFDMA. Thus, applying global CSDs to the entire EHT modulated portion 1004 may require changes to the implementations of the transmitter and receiver of the TB PPDU 1000.

In some other implementations, global CSDs may be applied only to the EHT-STF of the TB PPDU 1000. In such implementations, the transmitting device may apply a different phase slope (or different CSD values) to EHT-STF than to EHT-LTF and the data portion of the TB PPDU 1000, which may add more complexity to the implementation of the transmitter of the TB PPDU 1000. However, local CSDs may be applied to the EHT-LTF and data portion of the TB PPD 1000 in conformance with existing versions of the IEEE 802.11 standard. Aspects of the present disclosure further recognize that the processing of EHT-STF at the receiving device is agnostic to (or unaffected by) the values of the CSDs. Thus, applying global CSDs exclusively to EHT-STF may reduce or minimize the required changes to the implementations of the transmitter and receiver of the TB PPDU 1000.

Figure 11:
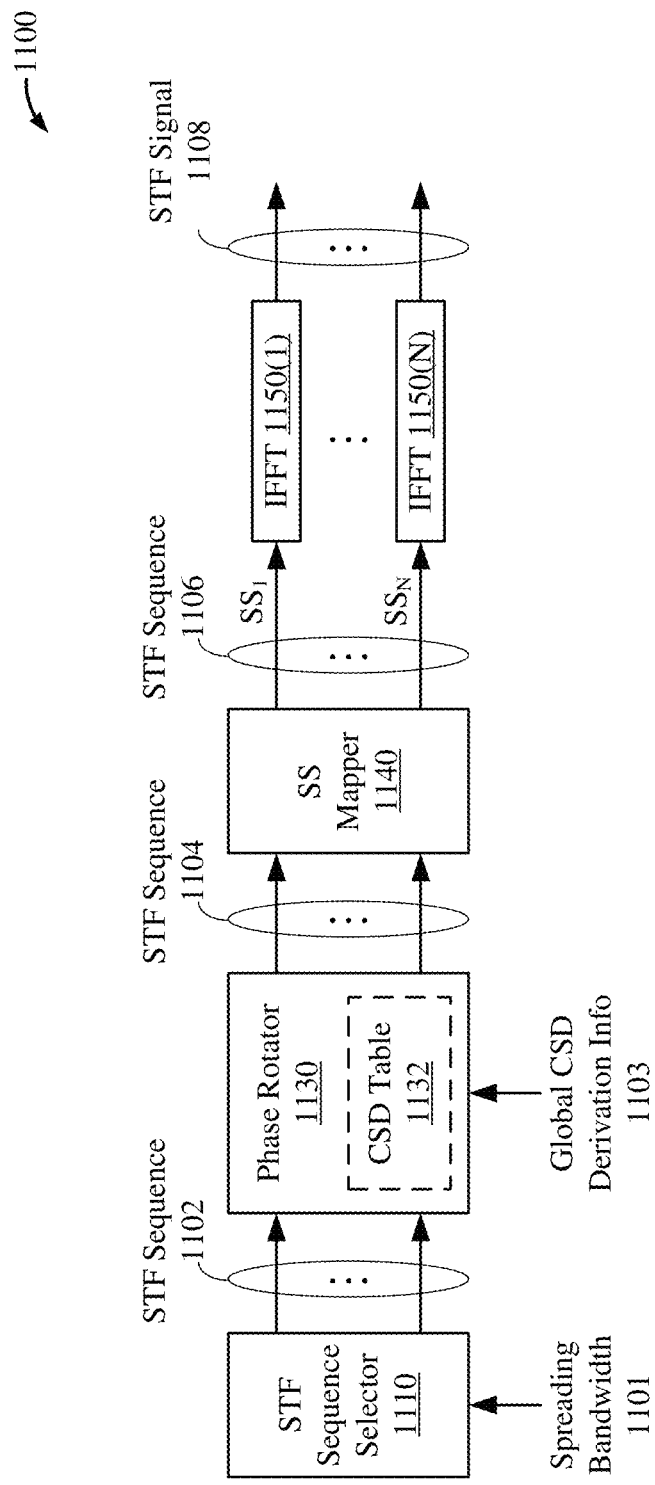
FIG. 11 shows a block diagram of an example transmit (TX) processing chain of a wireless communication device according to some implementations.

FIG. 11 shows a block diagram of an example transmit (TX) processing chain 1100 of a wireless communication device according to some implementations. More specifically, the TX processing chain 1100 may be configured to transmit an STF sequence 1102 representing an EHT-STF of a PPDU (such as the EHT-STF 822 of FIG. 8 or the EHT-STF of FIG. 10). In some implementations, the wireless communication device may be an AP such as any of the APs 102 or 502 of FIGS. 1 and 5A, respectively. In some other implementations, the wireless communication device may be a STA such as any of the STAs 104 or 504 of FIGS. 1 and 5B, respectively.

The TX processing chain 1100 includes an STF sequence selector 1110, a CSD phase rotator 1130, a spatial stream (SS) mapper 1140, and a number (N) of inverse fast Fourier transforms (IFFTs) 1150(1)-1150(n). The STF sequence selector 1110 selects the STF sequence 1102 to be transmitted in the PPDU. In some aspects, the STF sequence selector 1110 may select the STF sequence 1102 based on a spreading bandwidth 1101 associated with a dRU allocated for transmission, in the PPDU, by the wireless communication device. In some implementations, the STF sequence selector 1110 may select an STF sequence 1102 that maps to the spreading bandwidth 1101 in accordance with existing versions of the IEEE 802.11 standard (such as described with reference to FIGS. 8 and 9). The selected STF sequence 1102 is copied onto a number (n) of data streams.

The phase rotator 1130 is configured to apply n CSDs to the n data streams, respectively, of the STF sequence 1102 to produce a phase rotated STF sequence 1104. For example, the CSDs may add phase rotations or delays to one or more of the n data streams to prevent unintentional beamforming at the receiving device. As described with reference to FIGS. 8-10, multiple STAs may concurrently transmit the same STF sequence on the same set of tones when assigned respective dRUs within the same spreading bandwidth. In some aspects, the phase rotator 1130 may assign a respective global CSD value to each of the n CSDs to prevent unintentional beamforming across multiple STAs. For example, the phase rotator 1130 may determine or select the n global CSD values responsive to being allocated a dRU for transmission in a TB PPDU.

The SS mapper 1120 maps the phase-rotated n-stream STF sequence 1104 to N TX chain signals $SS_1$-$SS_N$ to produce a spatially mapped STF sequence 1106. For example, the SS mapper 1120 may apply a spatial mapping matrix (such as a Q matrix) to the modulation values associated with the STF sequence 1104. As a result of the spatial mapping, each of the data streams is projected on a respective transmitter chain (as the spatially mapped STF sequence 1106). The IFFTs 1150(1)-1150(N) convert the STF sequence 1106 on the N TX chain signals $SS_1$-$SS_N$, respectively, from the frequency domain to the time domain. For example, each IFFT 1150 may produce a respective series of time-varying samples representative of the modulation values mapped to each spatial stream. The time-varying samples represent a time-domain STF signal 1108 that can be transmitted, over a wireless channel, via n transmitter chains (not shown for simplicity).

Aspects of the present disclosure recognize that the effectiveness of the phase rotator 1130 at decoupling the STF signals 1108 from any STF signals that are concurrently transmitted concurrently by other wireless communication devices depends on the uniqueness of the global CSD values. Ideally, the global CSD values applied by the phase rotator 1130 should be different than the global CSD values applied by any other wireless communication devices associated with the same TB PPDU. Thus, in some implementations, the phase rotator 1130 may derive the global CSD values based on global CSD derivation information 1103 that is unique to the wireless communication device. In some aspects, the global CSD derivation information 1103 may include information that is assigned to the wireless communication device. Example suitable information may include an association identifier (AID) value, an RU index or an RU assignment index associated with its assigned dRU, or a start tone offset associated with its assigned dRU, among other examples.

In some implementations, the phase rotator 1130 may randomly generate the n global CSD values, for example, using a random number generator or as a function of the information assigned to the wireless communication device. For example, the global CSD values may be generated as a function of the AID value, a maximum (M) global CSD value (such as 800 ns), a granularity (Δ) of the global CSD values (such as 25 ns), and a desired distance or spacing (D) between AID values, according to Equation 1.

$$CSD^0 = \mod\left(AID*D, \frac{M}{\Delta}\right)*\Delta \quad (1)$$

The phase rotator 1130 can generate an initial global CSD value ($CSD^0$) for the wireless communication device based on Equation 1. In some implementations, the phase rotator 1130 may generate the remaining n−1 global CSD values by incrementing $CSD^0$ by a factor of A (for example, n−1 times). The value of D is used to increase the spacing between AID values to reduce the likelihood of assigning overlapping global CSD values to different STAs (also referred to herein as "collisions"). For example, D may be set to $$\frac{M}{2\Delta} - 1.$$

In some other implementations, a number (N) of global CSD values may be generally defined for all dRU transmissions. In such implementations, each wireless communication device that supports distributed transmissions has knowledge of the same N global CSD values. For example, each of the N global CSD values may be stored as a respective entry in a CSD table 1132. In some implementations, N may be equal to 8. An example CSD table having 8 entries (N=8) is shown below, where the value of each entry indicates a respective amount of delay (in ns):

[0 −400 −200 −600 −350 −650 −100 −750]

In some other implementations, N may be equal to 16. Aspects of the present disclosure recognize that increasing the number of distinct global CSD values (larger values of N) reduces the likelihood of collisions. However, larger CSD tables also may require changes to the IEEE 802.11 standard and to the implementation of the transmitter. An example CSD table having 16 entries (N=16) is shown below, where the value of each entry indicates a respective amount of delay (in ns):

[0 −400 −200 −600 −350 −650 −100 −750 −250 −550 −300 −450 −50 −700 −150 −500]

Another example CSD table having 16 entries (N=16) is shown below, where the values of the last 8 entries are rotated versions of the first 8 entries:

[0 −400 −200 −600 −350 −650 −100 −750(0+Δ)(− 400+Δ)(−200+Δ)(−600+Δ)(−350+Δ) (−650+Δ)(− 100+Δ)(−750+Δ)]

In the CSD table above, A represents a phase offset (such as 50 ns) that can be applied to each of the first 8 entries of the CSD table to produce the last 8 entries of the CSD table.

In some implementations, the phase rotator 1130 may algorithmically determine a start index associated with the CSD table 1132 based on the information assigned to the wireless communication device (STA_assignment_info). For example, the start index may be calculated as a function of STA_assignment_info and N, according to Equation 2.

start index=mod(STA_assignment_info,*N*)+1 (2)

Based on Equation 2, the start index will have a value between 0 and N−1, which points to one of the N entries of the CSD table 1132. Thus, the phase rotator 1130 may use the start index to determine an initial global CSD value for the wireless communication device. In some implementations, the phase rotator 1130 may determine the remaining n−1 global CSD values by incrementing the start index (for example, n−1 times) and retrieving the corresponding entries from the CSD table 1132.

In some implementations, STA_assignment_info may be an AID value assigned to the wireless communication device. For example, each STA associated with a BSS is assigned an AID value that identifies the STA within the BSS. The AID value is known to the wireless communication device upon associating with the BSS and may be used to identify user-specific information carried in a trigger frame (such as in a user information field). In some other implementations, STA_assignment_info may be an RU assignment index or RU index associated with the dRU assigned to the wireless communication device. For example, a trigger frame may allocate a dRU to a STA based on an RU assignment index that conforms with an existing RU allocation table. The RU assignment index or RU index may indicate the size and relative position of the dRU within a given bandwidth (such as the first 26-tone dRU of a 40 MHz bandwidth, the second 26-tone dRU of a 40 MHz bandwidth, the first 52-tone dRU of an 80 MHz bandwidth, or the second 52-tone dRU of an 80 MHz bandwidth, among other examples).

Still further, in some implementations, STA_assignment_info may be a start tone offset associated with the DRU assigned to the wireless communication device. For example, dRUs that are mapped to the same spreading bandwidth are offset from one another by a number of subcarrier indices depending on the size of each dRU and its RU index. The distance between the first tone of a dRU of a given size and the first tone of the first dRU of that size is referred to herein as the "start tone offset." With reference for example to FIG. 7, the dRU 706 has a start tone offset equal to 0 because it is the first 26-tone dRU mapped to the 40 MHz spreading bandwidth. In contrast, the dRU 708 has a start tone offset equal to 9 because it is the second 26-tone dRU mapped to the 40 MHz spreading bandwidth and the first tone of the dRU 708 (mapped to subcarrier index 10) is offset by 9 subcarrier indices from the first tone of the dRU 706 (mapped to subcarrier index 1).

Aspects of the present disclosure recognize that collisions cannot be entirely avoided when each STA derives its own global CSD values (randomly or algorithmically). For example, some BSSs may randomly assign the same AID value to multiple STAs. Thus, when STA_assignment_info is the AID value of the wireless communication device, Equations 1 and 2 may produce the same CSD values for STAs that are assigned the same AID value. Further, when STA_assignment_info is the RU assignment index, Equation 2 may produce the same CSD values for multiple RU assignment indices (because the RU allocation table is fixed). For example, the modulo operation produces the same CSD value of 1 for RU assignment indices 0 and 8 (where N=8). A similar issue may occur when STA_assignment_info is the start tone offset. For example, the first 26-tone dRU in a 20 MHz spreading bandwidth has a start tone offset equal to 0 and the fifth 26-tone dRU in the 20 MHz bandwidth has a start tone offset equal to 8. Thus, when STA_assignment_info is the start tone offset, Equation 2 may produce the same CSD values for multiple dRU assignments.

Aspects of the present disclosure further recognize that dRU construction follows a hierarchical structure. In other words, larger dRUs are constructed from multiple smaller dRUs. Table 1 shows an example hierarchical dRU structure of 26-tone dRUs (dRU26), 52-tone dRUs (dRU52), and 106-tone dRUs (dRU106) associated with a 20 MHz bandwidth.

TABLE 1

| $dRU26_1$ | $dRU26_2$ | $dRU26_3$ | $dRU26_4$ | $dRU26_5$ | $dRU26_6$ | $dRU26_7$ | $dRU26_8$ | $dRU26_9$ |
|---|---|---|---|---|---|---|---|---|
| $dRU52_1$ | | $dRU52_2$ | | | $dRU52_3$ | | $dRU52_4$ | |
| $dRU106_1$ | | | | | $dRU106_2$ | | | |

This hierarchical structure can prevent overlapping dRUs from being allocated for transmission in the same frequency bandwidth or sub-band. Thus, in some aspects, new global CSD start index tables can be designed based on the hierarchical dRU structure to further reduce the probability of CSD collisions. Table 2 shows an example global CSD start index table associated with a 20 MHz bandwidth, where each entry of Table 2 maps to a respective dRU index (or dRU assignment index) in Table 1.

TABLE 2

| 1 | 2 | 3 | 4 | 4 | 5 | 6 | 7 | 8 |
|---|---|---|---|---|---|---|---|---|
| 1 | | 3 | | | 5 | | 7 | |
| 1 | | | | | 5 | | | |

In some implementations, the values of the global CSD start index tables can be used, in lieu of Equation 2, to determine each STA's global CSD values. For example, a STA that is assigned $dRU26_1$ in a 20 MHz spreading bandwidth (RU assignment index=0 and start tone offset=0) determines its start index to be equal to 1 according to Table 2.

In some aspects, the receiving device (or the device soliciting the TB PPDU) may assign the global CSD values to each STA associated with the TB PPDU. For example, the receiving device may provide an indication of the global CSD values assigned to each STA in the trigger frame soliciting the TB PPDU. In some implementations, the trigger frame may carry CSD information indicating a respective start index assigned to each of the STAs associated with the TB PPDU. In such implementations, the phase rotator 1130 may receive the start index as the global CSD derivation information 1103 and may retrieve the appropriate CSD values from the CSD table 1132 pointed to by the start index. In some implementations, the trigger frame may carry distributed transmission information indicating whether the RU assignment index allocated to each STA represents an rRU or a dRU and may carry dRU distribution bandwidth information indicating the spreading bandwidth associated with each dRU.

Figure 12:
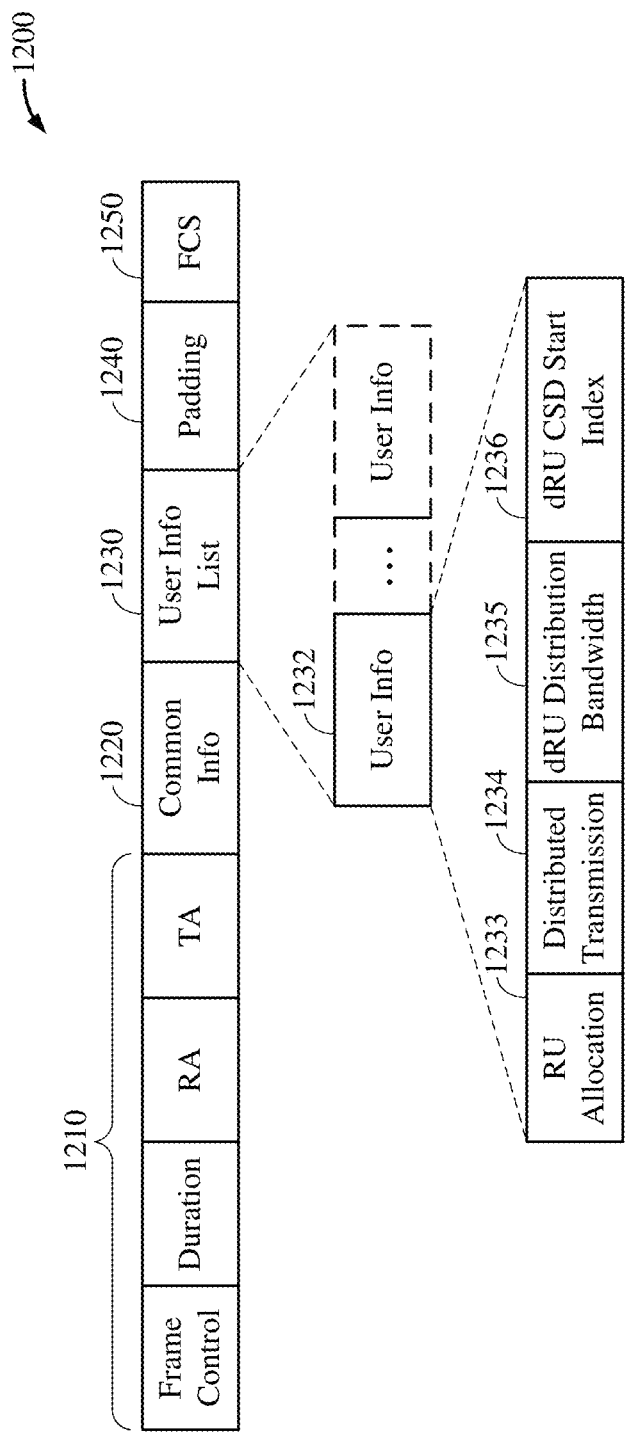
FIG. 12 shows an example trigger frame usable for communications between an AP and one or more STAs according to some implementations.

FIG. 12 shows an example trigger frame 1200 usable for communications between an AP and one or more STAs according to some implementations. The trigger frame 1200 may be used to solicit a TB PPDU (such as the TB PPDU 1000 of FIG. 10) from one or more STAs. With reference for example to FIG. 1, the AP 102 may transmit the trigger frame 1200 to solicit a TB PPDU from one or more of the STAs 104. The trigger frame 1200 may allocate resources (such as one or more rRUs or dRUs) for transmission in the TB PPDU.

The trigger frame 1200 includes a MAC header 1210, a common information field 1220, a user information list 1230, zero or more padding bits 1240, and an FCS 1250. The MAC header 1210 includes a frame control field, a duration field, a receiver address (RA) field, and a transmitter address (TA) field. The common information field 1220 and user information list 1230 carry configuration information which may be used by a receiving device to configure a TB PPDU to be transmitted in response to receiving the trigger frame 1200. In some aspects, the user information list 1230 may include one or more user information fields 1232 each carrying per-user information for a respective user. In contrast, the common information field 1220 may carry information that is common to all recipients of the trigger frame 1200 (such as any users identified in the user information list 1230).

In some implementations, each user information field 1232 may carry RU allocation information 1233, distributed transmission information 1234, dRU distribution bandwidth information 1235, and a dRU CSD start index 1236. The RU allocation information 1233 indicates a logical RU (or MRU) that is allocated for the user associated with the user information field 1232 and the distributed transmission information 1234 indicates whether the logical RU maps to an rRU or a dRU. If the distributed transmission information 1234 indicates that the logical RU is a dRU, the dRU distribution bandwidth information 1235 may indicate the spreading bandwidth associated with the dRU and the dRU CSD start index 1236 may point to a respective entry of a global CSD table that stores a number (N) of global CSD values.

In some implementations, the global CSD table (such as the CSD table 1132 of FIG. 11) may store 8 global CSD values (N=8). In such implementations, the dRU CSD start index 1236 may be a 3-bit value that points to a distinct entry of the global CSD table. In some other implementations, the global CSD table may store 16 global CSD values (N=16). In such implementations, the dRU CSD start index 1236 may be a 3-bit value that points to a respective entry in the upper half of the global CSD table or a respective entry in the lower half of the global CSD table. In some implementations, the user information field 1232 may further carry disambiguation information (such as an additional bit) signaling whether the dRU CSD start index 1236 points to an entry in the upper half of the global CSD table or the lower half of the global CSD table.

In some other implementations, the disambiguation information may be signaled implicitly. For example, the STA associated with the user information field 1232 may derive the disambiguation information based on other information assigned to the STA. In some implementations, the disambiguation information may be derived based on the AID value assigned to the STA. For example, STAs assigned to even AID values may interpret the dRU CSD start index 1236 as pointing to an entry in the upper half of the CSD table whereas STAs assigned to odd AID values may interpret the dRU CSD start index 1236 as pointing to an entry in the lower half of the CSD table.

The RU allocation information 1233 may be carried in an RU allocation subfield of the user information field 1232, such as defined by existing versions of the IEEE 802.11 standard. In other words, the existing RU allocation subfield can be reused to indicate the logical RU associated with an rRU or dRU transmission. In contrast, the distributed transmission information 1234, the dRU distribution bandwidth information 1235, and the dRU CSD start index 1236 represent new signaling that is currently not included in existing trigger frame formats. The distributed transmission information 1234 may require at least 1 bit (to indicate rRU or dRU), the dRU distribution bandwidth information 1235 may require at least 2 bits (to indicate a 20 MHz, 40 MHz, or 80 MHz spreading bandwidth), and the dRU CSD start index 1236 may require at least 3 bits.

Aspects of the present disclosure recognize that the trigger frame 1200 may include a number of reserved bits. Reserved bits represent unused bits that are reserved for future implementations of the IEEE 802.11 standard. For example, one or more reserved bits in an earlier version or release of the IEEE 802.11 standard may be repurposed (to carry information) in a later version or release. In some implementations, a number of reserved bits associated with an existing trigger frame format may be repurposed to carry the distributed transmission information 1234, the dRU distribution bandwidth information 1235, or the dRU CSD start index 1236. As described above, the new signaling may require at least 6 total bits to convey.

FIG. 13 shows a user information field 1300 for a trigger frame formatted in accordance with an existing trigger frame format. More specifically, the user information field 1300 conforms to the EHT variant user information field format defined by an initial release of the IEEE 802.11be amendment of the IEEE 802.11 standard. With reference for example to FIG. 12, the user information field 1300 may be one example of the user information field 1232. Each user information field in a user information list is identified by a respective AID value in the AID12 subfield (in bit positions B0-B11). In some aspects, the AID value may uniquely identify a particular STA (or user) in a BSS.

The user information field 1300 also includes an RU allocation subfield (in bit positions B12-B19) and a PS160 subfield (in bit position B39). A combined value of the RU allocation subfield and the PS160 subfield maps to an entry in an RU allocation table. The RU allocation table is a lookup table that stores a number of entries representing respective RU or MRU allocations. Specifically, each entry in the RU allocation table may indicate a bandwidth, an RU size, and an RU index. In some aspects, the RU allocation subfield may carry the RU allocation information 1233 of FIG. 12. In some implementations, any entry in the RU allocation table may be allocated for distributed transmissions. In some other implementations, only a subset of the entries in the RU allocation table may be allocated for distributed transmissions (such as 26-tone, 52-tone, 106-tone, and 242-tone RUs).

As shown in FIG. 13, the user information field 1300 includes a reserved bit (in bit position B25). In some aspects, the reserved bit (B25) of the user information field 1300 may be repurposed to carry the distributed transmission information 1234 of FIG. 12. For example, the reserved bit may be replaced by a distributed transmission bit (or subfield) in future releases or versions of the IEEE 802.11 standard. More specifically, a first value of the distributed transmission bit (such as "0") may indicate that the logical RU (or MRU) allocated by the RU allocation subfield maps to an rRU. On the other hand, a second value of the distributed transmission bit (such as "1") may indicate that the logical RU (or MRU) allocated by the RU allocation subfield maps to a dRU.

Aspects of the present disclosure recognize that MU MIMO may not be supported for distributed transmissions. As such, the SS allocation subfield (in bit positions B26-B31) can be repurposed to carry dRU-related signaling when the distributed transmission bit indicates that the logical RU maps to a dRU. In some implementations, 2 bits of the SS allocation subfield may be repurposed to carry the dRU distribution bandwidth information 1235, 3 bits of the SS allocation subfield may be repurposed to carry the dRU CSD start index 1236, and the last remaining bit of the SS allocation subfield may be repurposed to carry spatial stream information indicating a number of spatial streams assigned to the STA (such as 1 spatial stream or 2 spatial streams).

Figure 14:
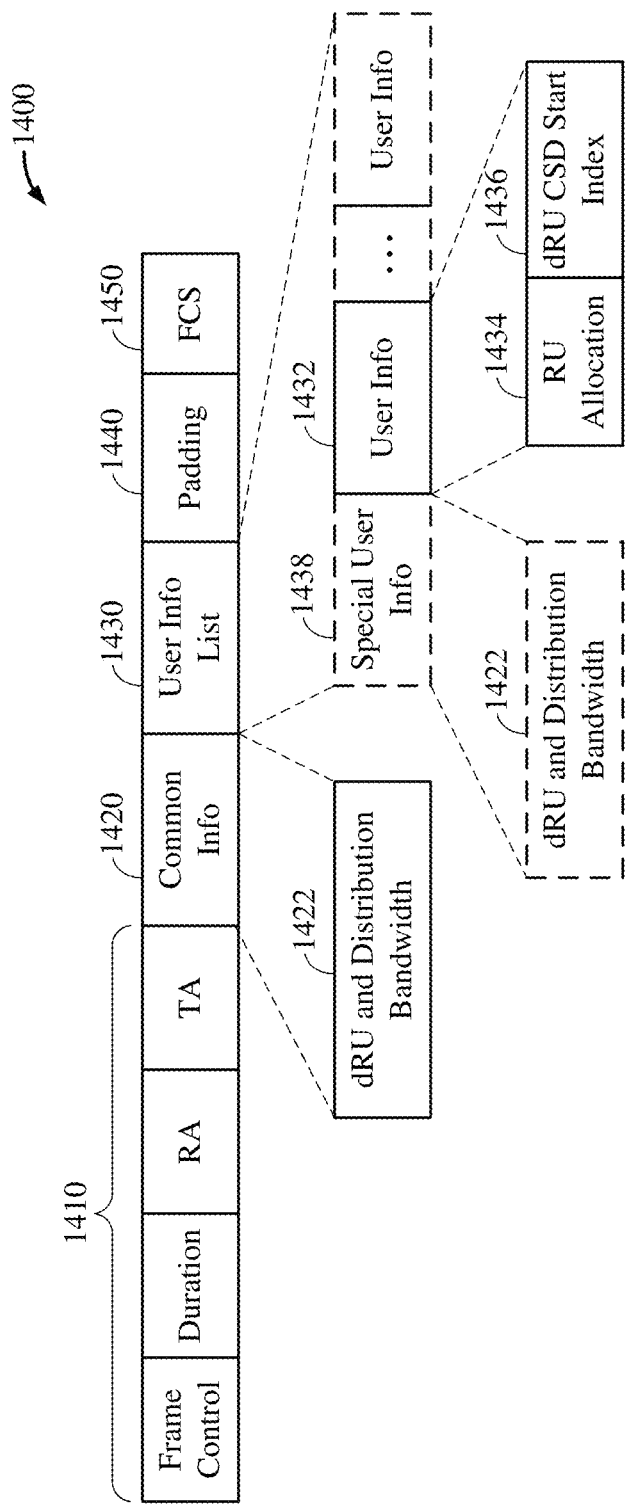
FIG. 14 shows another example trigger frame usable for communications between an AP and one or more STAs according to some implementations.

FIG. 14 shows another example trigger frame 1400 usable for communications between an AP and one or more STAs according to some implementations. The trigger frame 1400 may be used to solicit a TB PPDU (such as the TB PPDU 1000 of FIG. 10) from one or more STAs. With reference for example to FIG. 1, the AP 102 may transmit the trigger frame 1400 to solicit a TB PPDU from one or more of the STAs 104. The trigger frame 1400 may allocate resources (such as one or more rRUs or dRUs) for transmission in the TB PPDU.

The trigger frame 1400 includes a MAC header 1410, a common information field 1420, a user information list 1430, zero or more padding bits 1440, and an FCS 1450. The MAC header 1410 includes a frame control field, a duration field, an RA field, and a TA field. The common information field 1420 and user information list 1430 carry configuration information which may be used by a receiving device to configure a TB PPDU to be transmitted in response to receiving the trigger frame 1400. In some aspects, the user information list 1430 may include one or more user information fields 1432 each carrying per-user information for a respective user. In contrast, the common information field 1420 may carry information that is common to all recipients of the trigger frame 1400 (such as any users identified in the user information list 1430).

In some implementations, the common information field 1420 may carry dRU and distribution bandwidth information 1422 indicating whether the logical RUs allocated for transmission in a particular bandwidth or sub-band associated with the TB PPDU map to an rRU or a dRU. The dRU and distribution bandwidth information 1422 may further indicate a spreading bandwidth associated with any dRUs allocated for transmission within the given sub-band. In some implementations, the dRU and distribution bandwidth information 1422 may include a 3-bit bitmap per 80 MHz sub-band associated with the TB PPDU. Each bitmap may indicate whether the logical RUs associated with an 80 MHz sub-band map to:

an rRU;
a dRU spread over the first 20 MHz sub-band;
a dRU spread over the first 40 MHz sub-band;
a dRU spread over a 40 MHz portion of an 80 MHz sub-band;
a dRU spread over an 80 MHz sub-band;
a dRU spread over a 20 MHz portion plus a dRU spread over a 40 MHz portion of a (punctured) 80 MHz sub-band; or
a dRU spread over a 40 MHz portion plus a dRU spread over a 20 MHz portion of a (punctured) 80 MHz sub-band.

Aspects of the present disclosure recognize that 12 bits are needed for the dRU and distribution bandwidth information 1422 to cover an entire 320 MHz PPDU bandwidth. However, 12 bits may not be available to be repurposed in the common information field 1420. Thus, in some other implementations, some or all of the dRU and distribution bandwidth information 1422 may be carried in a special user information field 1438 of the user information list 1430. As described with reference to FIG. 13, each user information field 1432 of the user information list 1430 is identified by an AID value that is assigned to a particular STA in a BSS. In contrast, the special user information field 1438 may be identified by an AID value that is not assigned to any STA in the BSS (such as 2007). In some aspects, the special user information field 1438 may be an extension of the common information field 1420. In other words, the special user information field 1438 may carry information that is common to all users associated with the trigger frame.

In some implementations, each user information field 1432 may carry RU allocation information 1434 and a dRU CSD start index 1436. The RU allocation information 1434 indicates a logical RU (or MRU) that is allocated for the user associated with the user information field 1432. The STA may determine whether the logical RU maps to an rRU or a dRU based on the dRU and distribution bandwidth information 1422. For example, if the logical RU is allocated for transmission in an 80 MHz sub-band that is designated for rRUs, the STA may determine that its logical RU assignment maps to an rRU. On the other hand, if the logical RU is allocated for transmission in an 80 MHz sub-band that is designated for dRUs, the STA may determine that its logical RU assignment maps to a dRU. The spreading bandwidth associated with the dRU is further indicated by the dRU and distribution bandwidth information 1422.

If the dRU and distribution bandwidth information 1422 indicates that the logical RU is a dRU, the dRU CSD start index 1436 may point to a respective entry of a global CSD table that stores a number (N) of global CSD values. In some implementations, the global CSD table (such as the CSD table 1132 of FIG. 11) may store 8 global CSD values (N=8). In such implementations, the CSD start index 1436 may be a 3-bit value that points to a distinct entry of the global CSD table. In some other implementations, the global CSD table may store 16 global CSD values (N=16). In such implementations, the CSD start index 1436 may be a 3-bit value that points to a respective entry in the upper half of the global CSD table or a respective entry in the lower half of the global CSD table. The STA associated with the user information field 1432 may determine whether the dRU CSD start index 1436 points to an entry in the upper or lower half of the global CSD table based on explicit or implicit disambiguation information (such as described with reference to FIG. 12).

The RU allocation information 1434 may be carried in an RU allocation subfield of the user information field 1432, such as defined by existing versions of the IEEE 802.11 standard. In other words, the existing RU allocation subfield can be reused to indicate the logical RU associated with an rRU or dRU transmission. In contrast, the dRU and distribution bandwidth information 1422 and the dRU CSD start index 1436 represent new signaling that is currently not included in existing trigger frame formats. As described above, the dRU and distribution bandwidth information 1422 may require at least 12 bits and the dRU CSD start index 1436 may require at least 3 bits. In some implementations, the dRU CSD start index 1436 may be signaled by repurposing 3 bits of an SS allocation subfield of the user information field 1432 (such as described with reference to FIG. 13). In some implementations, the dRU and distribution bandwidth information 1422 may be signaled by repurposing a number of reserved bits in the common information field 1420 or a number of reserved bits in the special user information field 1438.

FIG. 15 shows a common information field 1500 for a trigger frame formatted in accordance with an existing trigger frame format. More specifically, the common information field 1500 conforms to the EHT variant common information field format defined by an initial release of the IEEE 802.11be amendment of the IEEE 802.11 standard. With reference for example to FIG. 14, the common information field 1500 may be one example of the common field

1420. In the example of FIG. 15, the common information field 1500 may be included in a trigger frame that is configured to solicit an EHT TB PPDU.

As shown in FIG. 15, the common information field 1500 includes a total of 8 reserved bits (in bit positions B56-B62 and B63). In some aspects, any number of the reserved bits may be repurposed to carry at least part of the dRU and distribution bandwidth information 1422 of FIG. 14. For example, the reserved bits may be replaced by a dRU and distribution bandwidth subfield in future releases or versions of the IEEE 802.11 standard. More specifically, the dRU and distribution bandwidth subfield may include at least 3 bits representing a bitmap associated with an 80 MHz sub-band of the PPDU bandwidth (such as described with reference to FIG. 14). In some implementations, the dRU and distribution bandwidth subfield may include an additional 3 bits representing a bitmap associated with another 80 MHz sub-band of the PPDU bandwidth.

Figure 16:
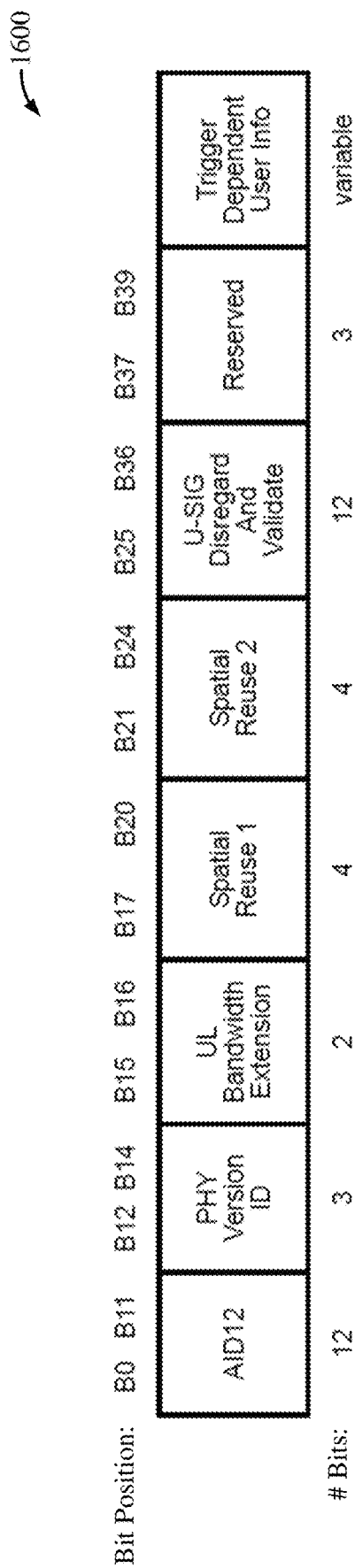
FIG. 16 shows a special user information field for a trigger frame formatted in accordance with an existing trigger frame format.

FIG. 16 shows a special user information field 1600 for a trigger frame formatted in accordance with an existing trigger frame format. More specifically, the special user information field 1600 conforms to the special user information field format defined by an initial release of the IEEE 802.11be amendment of the IEEE 802.11 standard. Thus, the AID12 subfield (in bit positions B0-B11) may carry an AID value equal to 2007. With reference for example to FIG. 14, the special user information field 1600 may be one example of the special user information field 1438. More specifically, the special user information field 1600 may be an extension of a common information field of the underlying trigger frame (such as the common information field 1420).

As shown in FIG. 16, the special user information field 1600 includes a total of 3 reserved bits (in bit position B37-B39) and 12 U-SIG disregard and validate bits (in bit positions B25-B36). In accordance with the EHT TB PPDU format, reserved bits are further subdivided into validate bits and disregard bits. The validate bits are used to indicate whether a STA should continue receiving the PPDU whereas the disregard bits may be ignored by the receiving STA. In some aspects, any number of the reserved bits may be repurposed to carry at least a portion of the dRU and distribution bandwidth information 1422 of FIG. 14. For example, the reserved bits may be replaced by a dRU and distribution bandwidth subfield in future releases or versions of the IEEE 802.11 standard. More specifically, the dRU and distribution bandwidth subfield may include 3 bits representing a bitmap associated with an 80 MHz sub-band of the PPDU bandwidth (such as described with reference to FIG. 14).

In some other aspects, any number of the U-SIG disregard and validate bits may be repurposed to carry at least a portion of the dRU and distribution bandwidth information 1422. For example, the U-SIG disregard and validate bits may be replaced by a dRU and distribution bandwidth subfield in future releases or versions of the IEEE 802.11 standard. More specifically, the dRU and distribution bandwidth subfield may include at least 3 bits representing a bitmap associated with an 80 MHz sub-band of the PPDU bandwidth. In some implementations, all 12 U-SIG disregard and validate bits may be repurposed to carry the dRU and distribution bandwidth information 1422 in its entirety. For example, the dRU and distribution bandwidth subfield may carry four 3-bit bitmaps that cover all 80 MHz sub-bands of a 320 MHz PPDU bandwidth. In such implementations, the dRU and distribution bandwidth information 1422 may be carried exclusively in the special user information field 1438 (in lieu of the common information field 1420).

Figure 17:
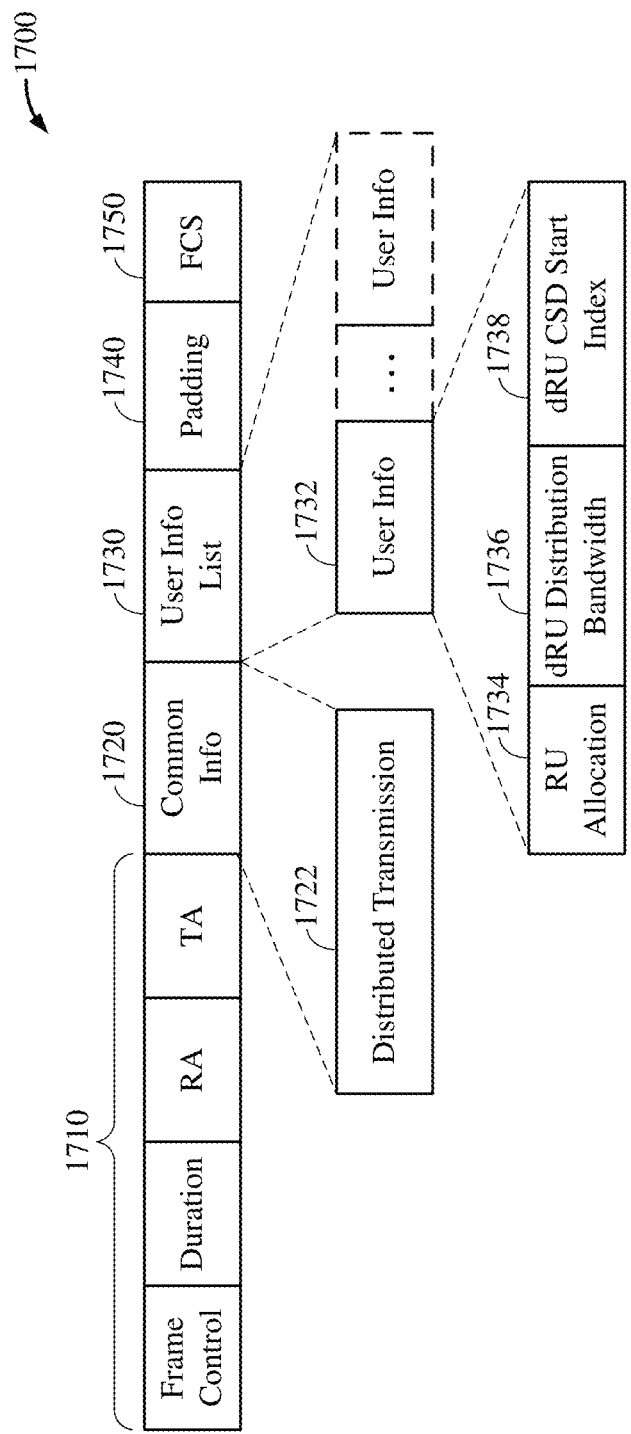
FIG. 17 shows another example trigger frame usable for communications between an AP and one or more STAs according to some implementations.

FIG. 17 shows another example trigger frame 1700 usable for communications between an AP and one or more STAs according to some implementations. The trigger frame 1700 may be used to solicit a TB PPDU (such as the TB PPDU 1000 of FIG. 10) from one or more STAs. With reference for example to FIG. 1, the AP 102 may transmit the trigger frame 1700 to solicit a TB PPDU from one or more of the STAs 104. The trigger frame 1700 may allocate resources (such as one or more rRUs or dRUs) for transmission in the TB PPDU.

The trigger frame 1700 includes a MAC header 1710, a common information field 1720, a user information list 1730, zero or more padding bits 1740, and an FCS 1750. The MAC header 1710 includes a frame control field, a duration field, an RA field, and a TA field. The common information field 1720 and user information list 1730 carry configuration information which may be used by a receiving device to configure a TB PPDU to be transmitted in response to receiving the trigger frame 1700. In some aspects, the user information list 1730 may include one or more user information fields 1732 each carrying per-user information for a respective user. In contrast, the common information field 1720 may carry information that is common to all recipients of the trigger frame 1700 (such as any users identified in the user information list 1730).

In some implementations, the common information field 1720 may carry distributed transmission information 1722 indicating whether the logical RUs allocated for transmission in a particular bandwidth or sub-band associated with the TB PPDU map to an rRU or a dRU. In some implementations, the distributed transmission information 1722 may include a 4-bit bitmap, where each bit corresponds to a respective 80 MHz sub-band associated with the TB PPDU. More specifically, each bit of the bitmap may indicate whether the logical RUs associated with a respective 80 MHz sub-band map to an rRU or a dRU.

In some implementations, each user information field 1732 may carry RU allocation information 1734, dRU distribution bandwidth information 1736, and a dRU CSD start index 1738. The RU allocation information 1734 indicates a logical RU (or MRU) that is allocated for the user associated with the user information field 1732. The STA may determine whether the logical RU maps to an rRU or a dRU based on the distributed transmission information 1722. For example, if the logical RU is allocated for transmission in an 80 MHz sub-band that is designated for rRUs, the STA may determine that its logical RU assignment maps to an rRU. On the other hand, if the logical RU is allocated for transmission in an 80 MHz sub-band that is designated for dRUs, the STA may determine that its logical RU assignment maps to a dRU. If the distributed transmission information 1722 indicates that the logical RU is a dRU, the dRU distribution bandwidth information 1736 may indicate the spreading bandwidth associated with the dRU and the dRU CSD start index 1738 may point to a respective entry of a global CSD table that stores a number (N) of global CSD values.

In some implementations, the global CSD table (such as the CSD table 1132 of FIG. 11) may store 8 global CSD values (N=8). In such implementations, the CSD start index 1738 may be a 3-bit value that points to a distinct entry of the global CSD table. In some other implementations, the global CSD table may store 16 global CSD values (N=16). In such implementations, the CSD start index 1738 may be a 3-bit value that points to a respective entry in the upper half of the global CSD table or a respective entry in the lower half of the global CSD table. The STA associated with the user information field 1732 may determine whether the dRU CSD start index 1738 points to an entry in the upper or lower half of the global CSD table based on explicit or implicit disambiguation information (such as described with reference to FIG. 12).

The RU allocation information 1734 may be carried in an RU allocation subfield of the user information field 1732, such as defined by existing versions of the IEEE 802.11 standard. In other words, the existing RU allocation subfield can be reused to indicate the logical RU associated with an rRU or dRU transmission. In contrast, the distributed transmission information 1722, the dRU distribution bandwidth information 1736, and the dRU CSD start index 1738 represent new signaling that is currently not included in existing trigger frame formats. As described above, the distributed transmission information 1722 may require at least 4 bits, the dRU distribution bandwidth information 1736 may require at least 2 bits (to indicate a 20 MHz, 40 MHz, or 80 MHz spreading bandwidth), and the dRU CSD start index 1738 may require at least 3 bits.

In some implementations, the dRU distribution bandwidth information 1736 may be signaled by repurposing 2 bits of an SS allocation subfield of the user information field 1732, and the dRU CSD start index 1738 may be signaled by repurposing 3 bits of the SS allocation subfield (such as described with reference to FIG. 13). In some implementations, the distributed transmission information 1722 may be signaled by repurposing 4 reserved bits in the common information field 1720 (as shown in FIG. 15). Still further, in some implementations, the distributed transmission information 1722 may be signaled by repurposing any number of reserved bits or U-SIG disregard and validate bits in a special user information field in the user information list 1730 (such as the special user information field 1600 of FIG. 16).

Figure 18:
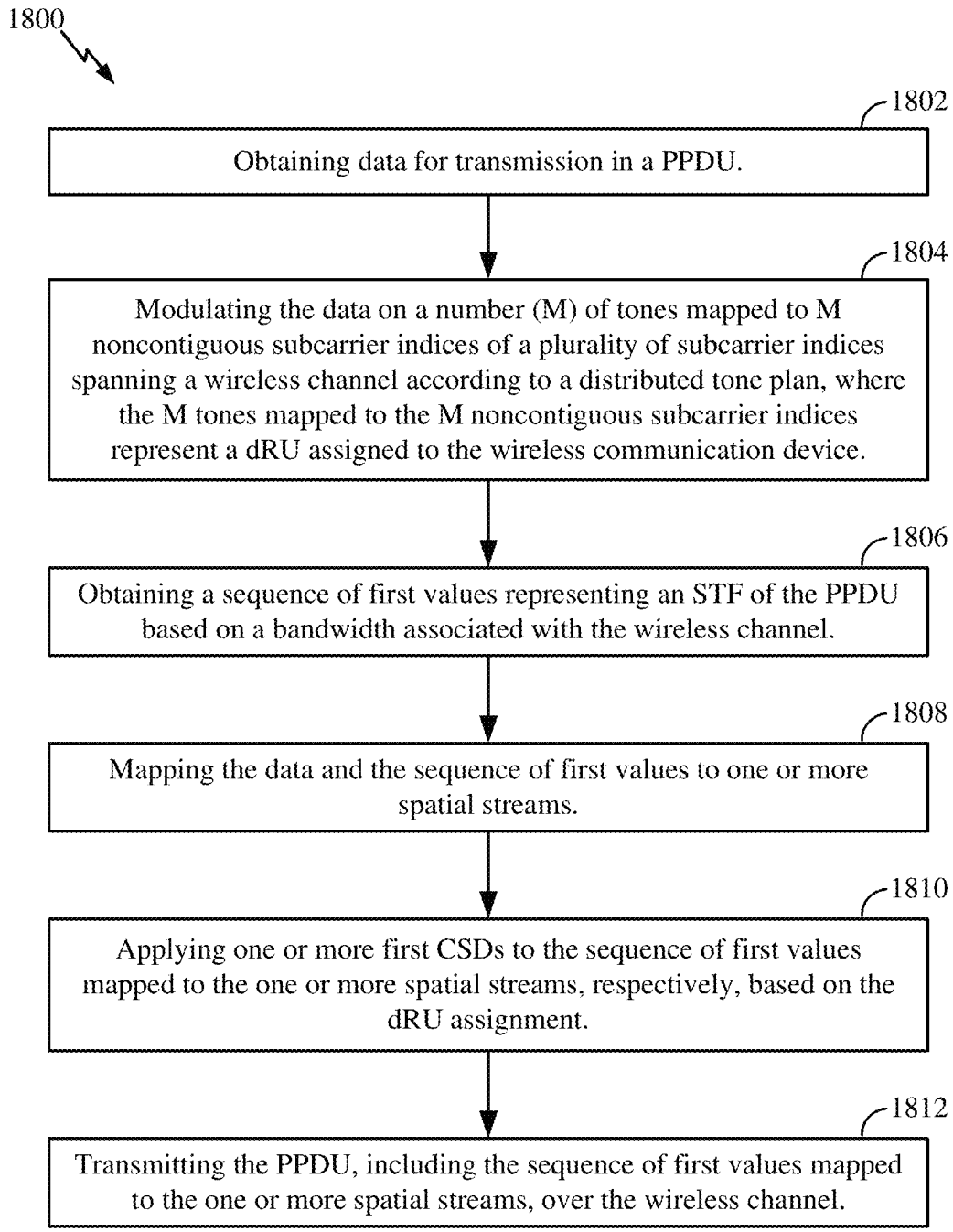
FIG. 18 shows a flowchart illustrating an example process for wireless communication that supports global cyclic shift delays (CSDs) for distributed transmissions.

FIG. 18 shows a flowchart illustrating an example process 1800 for wireless communication that supports global CSD in distributed transmissions according to some implementations. In some other implementations, the process 1800 may be performed by a wireless communication device operating as or within a network node, such as one of the STAs 104 or 504 described above with reference to FIGS. 1 and 5B, respectively.

In some implementations, the process 1800 begins in block 1802 with obtaining data for transmission in a PPDU. In block 1804, the process 1800 proceeds with modulating the data on a number (M) of tones mapped to M noncontiguous subcarrier indices of a plurality of subcarrier indices spanning a wireless channel according to a distributed tone plan, where the M tones mapped to the M noncontiguous subcarrier indices represent a dRU assigned to the wireless communication device. In block 1806, the process 1800 proceeds with obtaining a sequence of first values representing an STF of the PPDU based on a bandwidth associated with the wireless channel. In block 1808, the process 1800 proceeds with mapping the data and the sequence of first values to one or more spatial streams.

In block 1810, the process 1800 proceeds with applying one or more first CSDs to the sequence of first values mapped to the one or more spatial streams, respectively, based on the dRU assignment. In some aspects, the one or more first CSDs may be further applied to the data and an LTF of the PPDU mapped to the one or more spatial streams, respectively. In some other aspects, one or more second CSDs may be applied to the data and the LTF of the PPDU mapped to the one or more spatial streams, respectively, where the one or more second CSDs are different than the one or more first CSDs. In block 1812, the process 1800 proceeds with transmitting the PPDU, including the sequence of first values mapped to the one or more spatial streams, over the wireless channel.

In some aspects, the one or more first CSDs may be generated as a function of an AID value assigned to the wireless communication device. In some other aspects, the one or more first CSDs may be obtained from a CSD table having a number (N) of entries each indicating a respective CSD associated with the distributed tone plan. In some implementations, N may be equal to 8 or 16.

In some aspects, the one or more first CSDs may be obtained by calculating a start index associated with the one or more first CSDs based on information assigned to the wireless communication device, where the start index points to one of the N entries of the CSD table. In some implementations, the information assigned to the wireless communication device may include at least one of an AID value, an RU assignment index associated with the dRU, or a start tone offset associated with the dRU. In some implementations, the start index may be calculated as a modulo operation of the information assigned to the wireless communication device and N.

In some other aspects, the one or more first CSDs may be obtained from a trigger frame soliciting the PPDU from the wireless communication device, where the trigger frame carries CSD information indicating a start index associated with the one or more first CSDs, and where the start index points to one of the N entries of the CSD table. In some implementations, the CSD information may be carried in a user information field associated with the wireless communication device.

In some aspects, the trigger frame may further carry distributed transmission information indicating that the data is to be transmitted according to the distributed tone plan and may carry dRU distribution bandwidth information indicating the bandwidth associated with the wireless channel. In some implementations, the distributed transmission information and the dRU distribution bandwidth information may be carried in a user information field associated with the wireless communication device. In some other implementations, the distributed transmission information may be carried in a common information field, or a special user information field immediately following the common information field, and the dRU distribution bandwidth information may be carried in a user information field associated with the wireless communication device.

Figure 19:
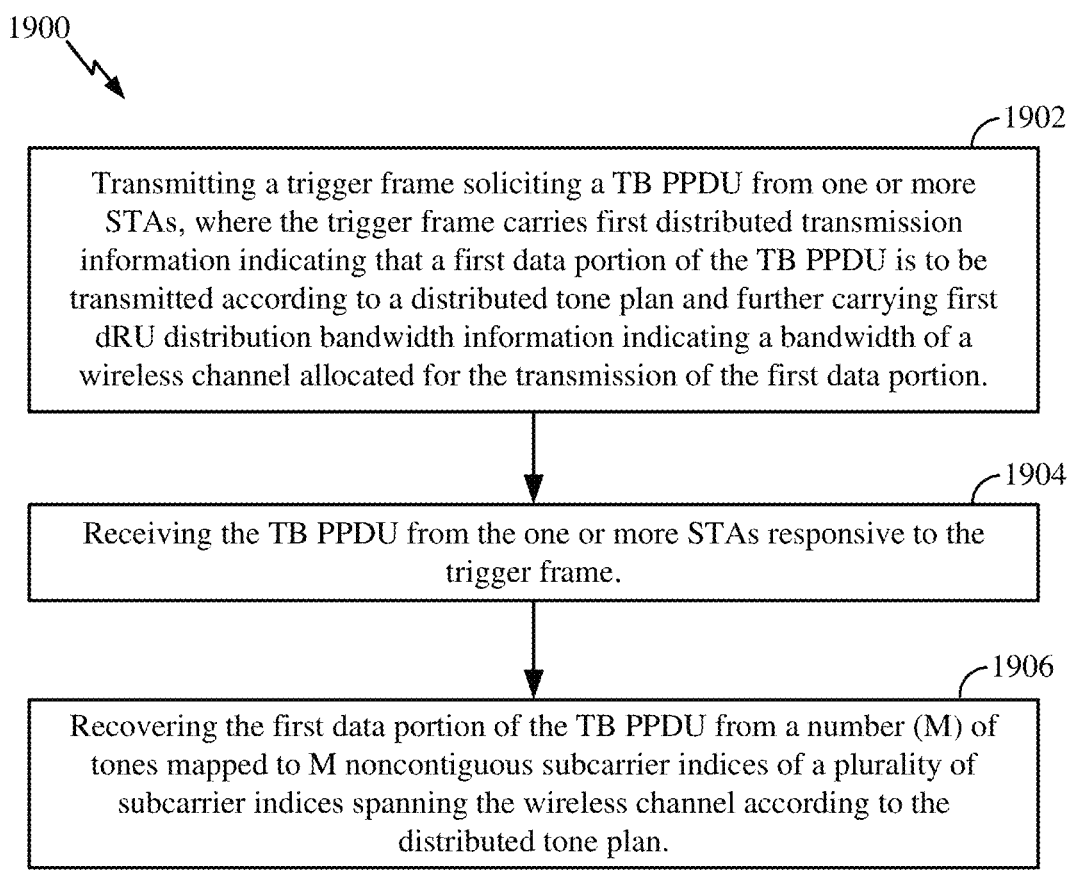
FIG. 19 shows a flowchart illustrating an example process for wireless communication that supports global CSDs for distributed transmissions.

FIG. 19 shows a flowchart illustrating an example process 1900 for wireless communication that supports global CSD in distributed transmissions according to some implementations. In some implementations, the process 1900 may be performed by a wireless communication device operating as or within an AP, such as one of the APs 102 or 502 described above with reference to FIGS. 1 and 5A, respectively.

In some implementations, the process 1900 begins in block 1902 with transmitting a trigger frame soliciting a TB PPDU from one or more STAs, where the trigger frame carries first distributed transmission information indicating that a first data portion of the TB PPDU is to be transmitted according to a distributed tone plan and further carrying first dRU distribution bandwidth information indicating a bandwidth of a wireless channel allocated for the transmission of the first data portion. In block 1904, the process 1900 proceeds with receiving the TB PPDU from the one or more STAs responsive to the trigger frame. In block 1906, the process 1900 proceeds with recovering the first data portion of the TB PPDU from a number (M) of tones mapped to M noncontiguous subcarrier indices of a plurality of subcarrier indices spanning the wireless channel according to the distributed tone plan.

In some implementations, the first distributed transmission information and the first dRU distribution bandwidth information may be carried in a user information field associated with a first STA of the one or more STAs. In some other implementations, the first distributed transmission information may be carried in a common information field, or a special user information field immediately following the common information field, and the first dRU distribution bandwidth information may be carried in a user information field associated with a first STA of the one or more STAs.

In some implementations, the trigger frame may further carry second distributed transmission information indicating that a second data portion of the TB PPDU is to be transmitted according to the distributed tone plan and may carry second dRU distribution bandwidth information indicating that the bandwidth of the wireless channel is allocated for the transmission of the second data portion. In some implementations, the first data portion may be received on one or more first spatial streams and the second data portion may be received on one or more second spatial streams, where the TB PPDU further includes an STF carrying a sequence of first values that is received on each of the one or more first spatial streams and on each of the one or more second spatial streams.

In some aspects, the sequence of first values received on the one or more first spatial streams may be delayed by one or more first CSDs, respectively, and the sequence of first values received on the one or more second spatial streams may be delayed by one or more second CSDs, respectively. In some implementations, the trigger frame may further carry first CSD information indicating a first start index associated with the one or more first CSDs and may carry second CSD information indicating a second start index associated with the one or more second CSDs, where the first start index points to a first entry of a CSD table having a number (N) of entries each indicating a respective CSD associated with the distributed tone plan and where the second start index points to a second entry of the CSD table that is different than the first entry. In some implementations, N may be equal to 8 or 16. In some implementations, the first CSD information may be carried in a user information field associated with a first STA of the one or more STAs and the second CSD information may be carried in a user information field associated with a second STA of the one or more STAs.

In some implementations, the TB PPDU may further include an LTF carrying a sequence of second values that is received on each of the one or more first spatial streams and a sequence of third values that is received on each of the one or more second spatial streams, where the first data portion and the sequence of second values received on the one or more first spatial streams are delayed by the one or more first CSDs, respectively, and where the second data portion and the sequence of third values received on the one or more second spatial streams are delayed by the one or more second CSDs, respectively.

In some other implementations, the TB PPDU may further include an LTF carrying a sequence of second values that is received on each of the one or more first spatial streams and a sequence of third values that is received on each of the one or more second spatial streams, where the first data portion and the sequence of second values received on the one or more first spatial streams are delayed by one or more third CSDs, respectively, that are different than the one or more first CSDs, and where the second data portion and the sequence of third values received on the one or more second spatial streams are delayed by one or more fourth CSDs, respectively, that are different than the one or more second CSDs.

Figure 20:
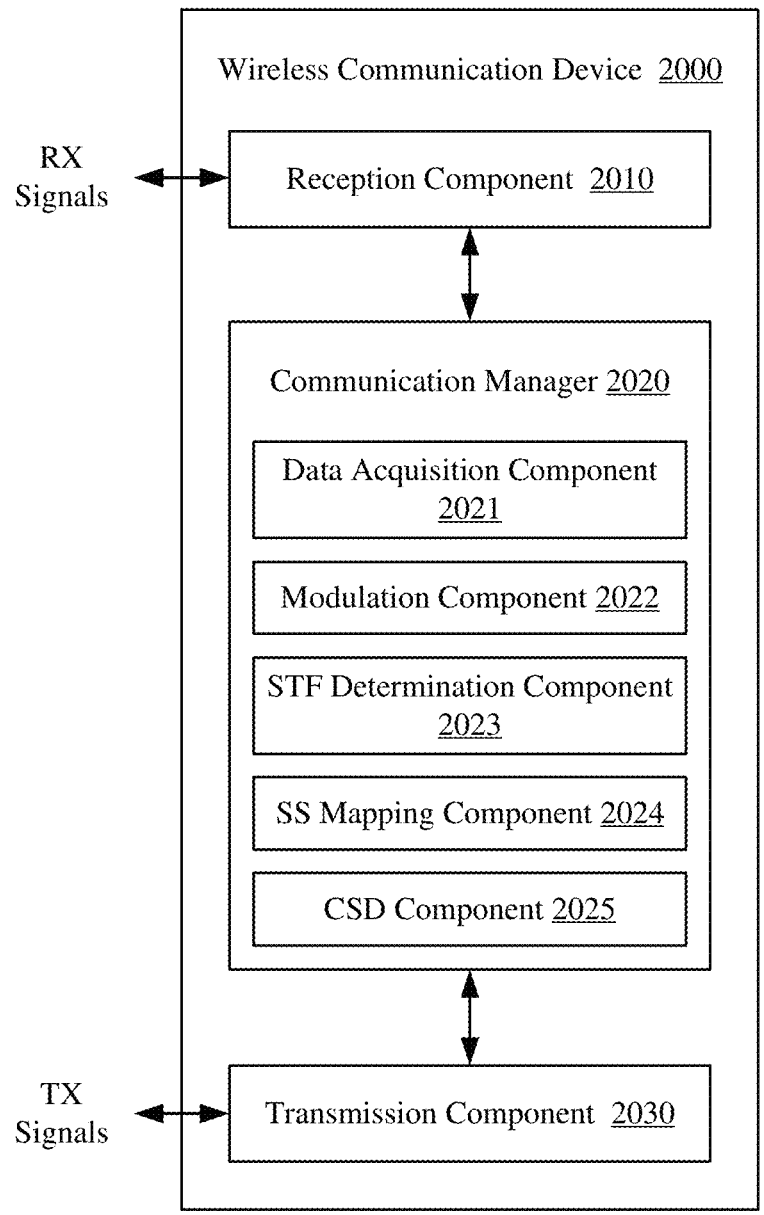
FIG. 20 shows a block diagram of an example wireless communication device according to some implementations.

FIG. 20 shows a block diagram of an example wireless communication device 2000 according to some implementations. In some implementations, the wireless communication device 2000 is configured to perform the process 1800 described above with reference to FIG. 18. The wireless communication device 2000 can be an example implementation of the wireless communication device 400 described above with reference to FIG. 4. For example, the wireless communication device 2000 can be a chip, SoC, chipset, package or device that includes at least one processor and at least one modem (for example, a Wi-Fi (IEEE 802.11) modem or a cellular modem).

The wireless communication device 2000 includes a reception component 2010, a communication manager 2020, and a transmission component 2030. The communication manager 2020 further includes a data acquisition component 2021, a modulation component 2022, an STF determination component 2023, a spatial stream (SS) mapping component 2024, and a CSD component 2025. Portions of one or more of the components 2021-2025 may be implemented at least in part in hardware or firmware. In some implementations, at least some of the components 2021,2022,2023,2024, or 2025 are implemented at least in part as software stored in a memory (such as the memory 408). For example, portions of one or more of the components 2021-2025 can be implemented as non-transitory instructions (or "code") executable by a processor (such as the processor 406) to perform the functions or operations of the respective component.

The reception component 2010 is configured to receive RX signals, over a wireless channel, from one or more other wireless communication devices. The communication manager 2020 is configured to control or manage communications with one or more other wireless communication devices. In some implementations, the data acquisition component 2021 may obtain data for transmission in a PPDU; the modulation component 2022 may modulate the data on a number (M) of tones mapped to M noncontiguous subcarrier indices of a plurality of subcarrier indices spanning a wireless channel according to a distributed tone plan, where the M tones mapped to the M noncontiguous subcarrier indices represent a dRU assigned to the wireless communication device; the STF determination component 2023 may obtain a sequence of values representing an STF of the PPDU based on a bandwidth associated with the wireless channel; the SS mapping component 2024 may map the data and the sequence of values to one or more spatial streams; and the CSD component 2025 may apply one or more CSDs to the sequence of values mapped to the one or more spatial streams, respectively, based on the dRU assignment. The transmission component 2030 is configured to transmit TX signals, over a wireless channel, to one or more other wireless communication devices. In some implementations, the transmission component 2030 may transmit the PPDU, including the sequence of values mapped to the one or more spatial streams, over the wireless channel.

Figure 21:
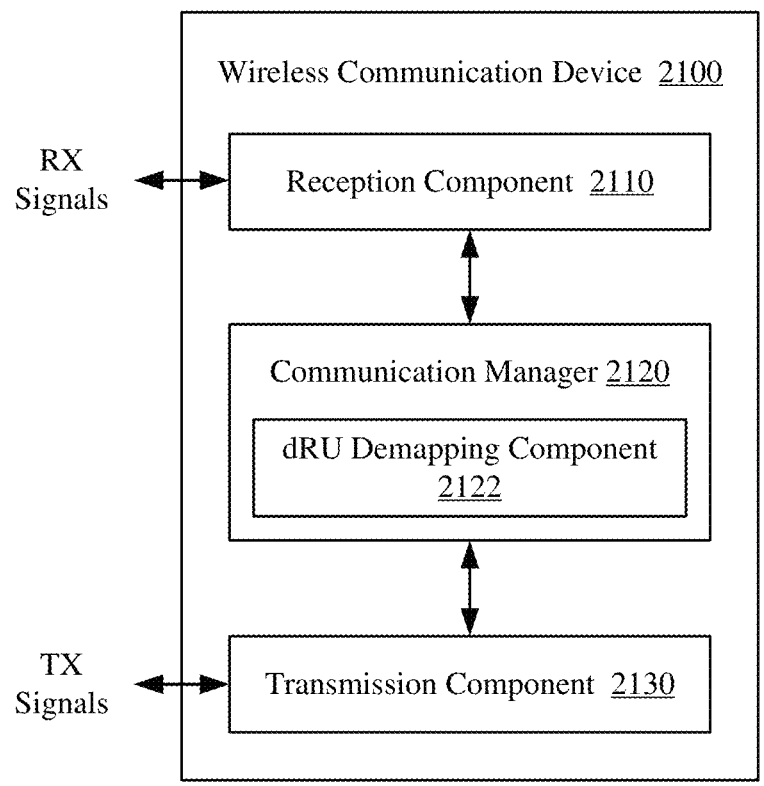
FIG. 21 shows a block diagram of an example wireless communication device according to some implementations.

FIG. 21 shows a block diagram of an example wireless communication device 2100 according to some implementations. In some implementations, the wireless communication device 2100 is configured to perform the process 1900 described above with reference to FIG. 19. The wireless communication device 2100 can be an example implementation of the wireless communication device 400 described above with reference to FIG. 4. For example, the wireless communication device 2100 can be a chip, SoC, chipset, package or device that includes at least one processor and at least one modem (for example, a Wi-Fi (IEEE 802.11) modem or a cellular modem).

The wireless communication device 2100 includes a reception component 2110, a communication manager 2120, and a transmission component 2130. The communication manager 2120 further includes a dRU demapping component 2122. Portions of the dRU demapping component 2122 may be implemented at least in part in hardware or firmware. In some implementations, the dRU demapping component 2122 may be implemented at least in part as software stored in a memory (such as the memory 408). For example, portions of the dRU demapping component 2122 can be implemented as non-transitory instructions (or "code") executable by a processor (such as the processor 406) to perform the functions or operations of the respective component.

The reception component 2110 is configured to receive RX signals, over a wireless channel, from one or more other wireless communication devices and the transmission component 2130 is configured to transmit TX signals, over the wireless channel, to one or more other wireless communication devices. In some implementations, the transmission component 2130 may transmit a trigger frame soliciting a TB PPDU from one or more STAs, where the trigger frame carries distributed transmission information indicating that a data portion of the TB PPDU is to be transmitted according to a distributed tone plan and further carries dRU distribution bandwidth information indicating a bandwidth of a wireless channel allocated for the transmission of the first data portion. In some implementations, the reception component 2110 may receive the TB PPDU from the one or more STAs responsive to the trigger frame. The communication manager 2120 is configured to control or manage communications with one or more other wireless communication devices. In some implementations, the dRU demapping component 2122 may recover the data portion of the TB PPDU from a number (M) of tones mapped to M noncontiguous subcarrier indices of a plurality of subcarrier indices spanning the wireless channel according to the distributed tone plan.

Implementation examples are described in the following numbered clauses:

1. A method for wireless communication by a wireless communication device, including:
   obtaining data for transmission in a physical layer convergence protocol (PLCP) protocol data unit (PPDU);
   modulating the data on a number (M) of tones mapped to M noncontiguous subcarrier indices of a plurality of subcarrier indices spanning a wireless channel according to a distributed tone plan, the M tones mapped to the M noncontiguous subcarrier indices representing a distributed resource unit (dRU) assigned to the wireless communication device; and
   obtaining a sequence of first values representing a short training field (STF) of the PPDU based on a bandwidth associated with the wireless channel;
   mapping the data and the sequence of first values to one or more spatial streams;
   applying one or more first cyclic shift delays (CSDs) to the sequence of first values mapped to the one or more spatial streams, respectively, based on the dRU assignment; and
   transmitting the PPDU, including the sequence of first values mapped to the one or more spatial streams, over the wireless channel 2. The method of clause 1, further including:
   obtaining a sequence of second values representing a long training field (LTF) of the PPDU;
   mapping the sequence of second values to the one or more spatial streams; and
   applying the one or more first CSDs to the data and the sequence of second values mapped to the one or more spatial streams, respectively.

3. The method of clause 1, further including: obtaining a sequence of second values representing an LTF of the PPDU; mapping the sequence of second values to the one or more spatial streams; and applying one or more second CSDs to the data and the sequence of second values mapped to the one or more spatial streams, respectively, the one or more second CSDs being different than the one or more first CSDs.

4. The method of any of clauses 1-3, further including:
   generating the one or more first CSDs as a function of an association identifier (AID) value assigned to the wireless communication device.

5. The method of any of clauses 1-3, further including:
   obtaining the one or more first CSDs from a CSD table having a number (N) of entries each indicating a respective CSD associated with the distributed tone plan.

6. The method of any of clauses 1-3 or 5, where N is equal to 8 or 16.

7. The method of any of clauses 1-3, 5, or 6, where the obtaining of the one or more first CSDs includes:
   calculating a start index associated with the one or more first CSDs based on information assigned to the wireless communication device, the start index pointing to one of the N entries of the CSD table.

8. The method of any of clauses 1-3 or 5-7, where the information assigned to the wireless communication device includes at least one of an AID value, a resource unit (RU) assignment index associated with the dRU, or a start tone offset associated with the dRU.

9. The method of any of clauses 1-3 or 5-8, where the start index is calculated as a modulo operation of the information assigned to the wireless communication device and N.

10. The method of any of clauses 1-3, 5, or 6, further including:
    receiving a trigger frame soliciting the PPDU from the wireless communication device, the trigger frame carrying CSD information indicating a start index associated with the one or more first CSDs, the start index pointing to one of the N entries of the CSD table.

11. The method of any of clauses 1-3, 5, 6, or 10, where the CSD information is carried in a user information field associated with the wireless communication device.

12. The method of any of clauses 1-3, 5, 6, 10, or 11, where the trigger frame further carries distributed transmission information indicating that the data is to be transmitted according to the distributed tone plan and carries dRU distribution bandwidth information indicating the bandwidth associated with the wireless channel.

13. The method of any of clauses 1-3, 5, 6, or 10-12, where the distributed transmission information and the dRU distribution bandwidth information are carried in a user information field associated with the wireless communication device.

14. The method of any of clauses 1-3, 5, 6, or 10-12, where the distributed transmission information is carried in a common information field, or a special user information field immediately following the common information field, and the dRU distribution bandwidth information is carried in a user information field associated with the wireless communication device.

15. A wireless communication device including:
at least one processor; and
at least one memory communicatively coupled with the at least one processor and storing processor-readable code that, when executed by the at least one processor, is configured to perform the method of any one or more of clauses 1-14.

16. A method for wireless communication performed by a wireless communication device, including:
transmitting a trigger frame soliciting a trigger-based (TB) physical layer convergence protocol (PLCP) protocol data unit (PPDU) from one or more wireless stations (STAs), the trigger frame carrying first distributed transmission information indicating that a first data portion of the TB PPDU is to be transmitted according to a distributed tone plan and further carrying first distributed resource unit (dRU) distribution bandwidth information indicating a bandwidth of a wireless channel allocated for the transmission of the first data portion;
receiving the TB PPDU from the one or more STAs responsive to the trigger frame; and
recovering the first data portion of the TB PPDU from a number (M) of tones mapped to M noncontiguous subcarrier indices of a plurality of subcarrier indices spanning the wireless channel according to the distributed tone plan.

17. The method of clause 16, where the first distributed transmission information and the first dRU distribution bandwidth information are carried in a user information field associated with a first STA of the one or more STAs.

18. The method of clause 16, where the first distributed transmission information is carried in a common information field, or a special user information field immediately following the common information field, and the first dRU distribution bandwidth information is carried in a user information field associated with a first STA of the one or more STAs.

19. The method of any of clauses 16-18, where the trigger frame further carries second distributed transmission information indicating that a second data portion of the TB PPDU is to be transmitted according to the distributed tone plan and carries second dRU distribution bandwidth information indicating that the bandwidth of the wireless channel is allocated for the transmission of the second data portion.

20. The method of any of clauses 16-19, where the first data portion is received on one or more first spatial streams and the second data portion is received on one or more second spatial streams, the TB PPDU further including a short training field (STF) carrying a sequence of first values that is received on each of the one or more first spatial streams and on each of the one or more second spatial streams.

21. The method of any of clauses 16-20, where the sequence of first values received on the one or more first spatial streams is delayed by one or more first cyclic shift delays (CSDs), respectively, and the sequence of first values received on the one or more second spatial streams is delayed by one or more second CSDs, respectively.

22. The method of any of clauses 16-21, where the trigger frame further carries first CSD information indicating a first start index associated with the one or more first CSDs and carries second CSD information indicating a second start index associated with the one or more second CSDs, the first start index pointing to a first entry of a CSD table having a number (N) of entries each indicating a respective CSD associated with the distributed tone plan and the second start index pointing to a second entry of the CSD table that is different than the first entry.

23. The method of any of clauses 16-22, where N is equal to 8 or 16.

24. The method of any of clauses 16-23, where the first CSD information is carried in a user information field associated with a first STA of the one or more STAs and the second CSD information is carried in a user information field associated with a second STA of the one or more STAs.

25. The method of any of clauses 16-24, where the TB PPDU further includes a long training field (LTF) carrying a sequence of second values that is received on each of the one or more first spatial streams and a sequence of third values that is received on each of the one or more second spatial streams, the first data portion and the sequence of second values received on the one or more first spatial streams being delayed by the one or more first CSDs, respectively, and the second data portion and the sequence of third values received on the one or more second spatial streams being delayed by the one or more second CSDs, respectively.

26. The method of any of clauses 16-24, where the TB PPDU further includes an LTF carrying a sequence of second values that is received on each of the one or more first spatial streams and a sequence of third values that is received on each of the one or more second spatial streams, the first data portion and the sequence of second values received on the one or more first spatial streams being delayed by one or more third CSDs, respectively, that are different than the one or more first CSDs, and the second data portion and the sequence of third values received on the one or more second spatial streams being delayed by one or more fourth CSDs, respectively, that are different than the one or more second CSDs.

27. A wireless communication device including:
at least one processor; and
at least one memory communicatively coupled with the at least one processor and storing processor-readable code that, when executed by the at least one processor, is configured to perform the method of any one or more of clauses 16-26.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
obtaining data for transmission in a physical layer convergence protocol (PLCP) protocol data unit (PPDU);
modulating the data on a number (M) of tones of a logical resource unit (RU), the M tones mapped to M noncontiguous subcarrier indices of a plurality of subcarrier indices spanning a wireless channel according to a distributed tone plan, the M tones of the logical RU mapped to the M noncontiguous subcarrier indices representing a distributed resource unit (dRU) assigned to the wireless communication device, wherein a bandwidth of the wireless channel is larger than a bandwidth of the logical RU;
obtaining a sequence of first values representing a short training field (STF) of the PPDU based on a bandwidth associated with the wireless channel;
mapping the data and the sequence of first values to one or more spatial streams;
applying one or more first cyclic shift delays (CSDs) to the sequence of first values mapped to the one or more spatial streams, respectively, based on the dRU assignment; and
transmitting the PPDU, including the sequence of first values mapped to the one or more spatial streams, over the wireless channel.

2. The method of claim 1, further comprising:
obtaining a sequence of second values representing a long training field (LTF) of the PPDU;
mapping the sequence of second values to the one or more spatial streams; and
applying the one or more first CSDs to the data and the sequence of second values mapped to the one or more spatial streams, respectively.

3. The method of claim 1, further comprising:
obtaining a sequence of second values representing an LTF of the PPDU;
mapping the sequence of second values to the one or more spatial streams; and
applying one or more second CSDs to the data and the sequence of second values mapped to the one or more spatial streams, respectively, the one or more second CSDs being different than the one or more first CSDs.

4. The method of claim 1, further comprising:
generating the one or more first CSDs as a function of an association identifier (AID) value assigned to the wireless communication device.

5. The method of claim 1, further comprising:
obtaining the one or more first CSDs from a CSD table having a number (N) of entries each indicating a respective CSD associated with the distributed tone plan.

6. The method of claim 5 wherein N is equal to 8 or 16.

7. The method of claim 5, wherein the obtaining of the one or more first CSDs comprises:
calculating a start index associated with the one or more first CSDs based on information assigned to the wireless communication device, the start index pointing to one of the N entries of the CSD table.

8. The method of claim 7, wherein the information assigned to the wireless communication device includes at least one of an AID value, a resource unit (RU) assignment index associated with the dRU, or a start tone offset associated with the dRU.

9. The method of claim 8, wherein the start index is calculated as a modulo operation of the information assigned to the wireless communication device and N.

10. The method of claim 5, further comprising:
receiving a trigger frame soliciting the PPDU from the wireless communication device, the trigger frame carrying CSD information indicating a start index associated with the one or more first CSDs, the start index pointing to one of the N entries of the CSD table.

11. The method of claim 10, wherein the CSD information is carried in a user information field associated with the wireless communication device.

12. The method of claim 10, wherein the trigger frame further carries distributed transmission information indicating that the data is to be transmitted according to the distributed tone plan and carries dRU distribution bandwidth information indicating the bandwidth associated with the wireless channel.

13. The method of claim 12, wherein the distributed transmission information and the dRU distribution bandwidth information are carried in a user information field associated with the wireless communication device.

14. The method of claim 12, wherein the distributed transmission information is carried in a common information field, or a special user information field immediately following the common information field, and the dRU distribution bandwidth information is carried in a user information field associated with the wireless communication device.

15. A wireless communication device for wireless communication, comprising:
one or more memories storing processor-executable code; and
one or more processors coupled with the one or more memories and operable to execute the code to cause the wireless communication device to:
obtain data for transmission in a physical layer convergence protocol (PLCP) protocol data unit (PPDU);
modulate the data on a number (M) of tones of a logical resource unit (RU), the M tones mapped to M noncontiguous subcarrier indices of a plurality of subcarrier indices spanning a wireless channel according to a distributed tone plan, the M tones of the logical RU mapped to the M noncontiguous subcarrier indices representing a distributed resource unit (dRU) assigned to the wireless communication device, wherein a bandwidth of the wireless channel is larger than a bandwidth of the logical RU;
obtain a sequence of values representing a short training field (STF) of the PPDU based on a bandwidth associated with the wireless channel;
map the data and the sequence of values to one or more spatial streams;
apply one or more cyclic shift delays (CSDs) to the sequence of values mapped to the one or more spatial streams, respectively, based on the dRU assignment; and
transmit the PPDU, including the sequence of values mapped to the one or more spatial streams, over the wireless channel.

16. The wireless communication device of claim 15, wherein the one or more processors are operable to execute the code to cause the wireless communication device to:
generate the one or more CSDs as a function of an association identifier (AID) value assigned to the wireless communication device.

17. The wireless communication device of claim 15, wherein the one or more processors are operable to execute the code to cause the wireless communication device to:
calculate a start index associated with one or more first CSDs based on information assigned to the wireless communication device; and
obtain, based on the start index, the one or more first CSDs from a CSD table having a number (N) of entries each indicating a respective CSD associated with the distributed tone plan, the start index pointing to one of the N entries of the CSD table.

18. The wireless communication device of claim 15, wherein the one or more processors are operable to execute the code to cause the wireless communication device to:
receive a trigger frame soliciting the PPDU from the wireless communication device, the trigger frame carrying CSD information indicating a start index associated with one or more first CSDs; and
obtain, based on the start index, the one or more first CSDs from a CSD table having a number (N) of entries each indicating a respective CSD associated with the distributed tone plan, the start index pointing to one of the N entries of the CSD table.

* * * * *